(12) United States Patent
Murata

(10) Patent No.: US 7,787,269 B2
(45) Date of Patent: Aug. 31, 2010

(54) SWITCHING POWER SUPPLY DEVICE

(75) Inventor: Kazuhiro Murata, Osaka (JP)

(73) Assignee: Panasonic Corporation, Osaka (JP)

( * ) Notice: Subject to any disclaimer, the term of this patent is extended or adjusted under 35 U.S.C. 154(b) by 295 days.

(21) Appl. No.: 12/119,154

(22) Filed: May 12, 2008

(65) Prior Publication Data

US 2008/0278134 A1 Nov. 13, 2008

(30) Foreign Application Priority Data

May 10, 2007 (JP) ............................. 2007-125935

(51) Int. Cl.
*H02H 7/122* (2006.01)
*H02M 3/335* (2006.01)
(52) U.S. Cl. ................. 363/56.11; 363/56.12
(58) Field of Classification Search .................. 363/18, 363/21.08, 21.16, 56.05, 56.11, 56.12
See application file for complete search history.

(56) References Cited

U.S. PATENT DOCUMENTS

2004/0223344 A1* 11/2004 Jacobs ......................... 363/20
2005/0174811 A1* 8/2005 Liu et al. .................. 363/21.01

FOREIGN PATENT DOCUMENTS

| JP | 6-197530 A | 7/1994 |
|---|---|---|
| JP | 2004-48884 A | 2/2004 |

* cited by examiner

*Primary Examiner*—Gary L Laxton
(74) *Attorney, Agent, or Firm*—RatnerPrestia

(57) ABSTRACT

The present invention provides a switching power supply device including a switching element, a control circuit controlling the switching element, a transformer having an auxiliary winding, a potential clamp circuit connected to one of outputs of the transformer, a delay capacitor connected to an output of the potential clamp circuit, a potential detection circuit detecting a potential at the delay capacitor, and an overload protection actuation circuit realizing overload protection. During an overload, the delay capacitor is charged only by ringing of the auxiliary winding, generated immediately after the switching element is turned off, through the potential clamp circuit. Then, the potential detection circuit supplies an actuation signal to a latch stop circuit by detecting that the potential at the delay capacitor rises. The latch stop circuit latches and stops the switching operation of the switching element to realize the overload protection when the actuation signal is fed into the latch stop circuit. Thus, the overload protection can be realized with a sufficient delay time by the relatively small delay capacitor.

30 Claims, 21 Drawing Sheets

Fig. 4B DURING NORMAL LOAD

Fig. 4A DURING OVERLOAD

SWITCHING POWER SUPPLY DEVICE

This application is based on Japanese Patent Application No. 2007-125935 filed in Japan on May 10, 2007, the contents of which are hereby incorporated by reference.

BACKGROUND OF THE INVENTION

1. Field of the Invention

The present invention relates to a switching power supply device capable of actuating an overload protection after a delay is developed for a predetermined time since an overload is detected.

2. Background Art

Conventionally, in a switching power supply, an overload protection or an overcurrent protection function has been proposed in order to prevent an excessive current from passing through an output portion and a device connected to the output portion in an abnormal state of the device.

In the protection, a method for detecting an overload and an overcurrent state becomes important from the technical viewpoint. Examples of the method for detecting an overload and an overcurrent state include a method for detecting an overload by a drop in voltage at an output portion of a switching power supply during the overload and a method in which a current passed through a switching element becomes a predetermined value or more, thereby detecting the overload.

For example, Japanese Patent Laid-open Publication No. 06-197530 discloses a flyback type switching power supply device in which a third winding of a transformer is utilized. The method will briefly be described with reference to a power supply circuit shown in FIG. 21. A primary winding 31a is connected in series to a switching element 1, a secondary winding 31b supplies power to an output portion, and an auxiliary winding 31c which is a third winding is provided independently of the primary winding 31a and the secondary winding 31b. The auxiliary winding 31c is equal in polarity to the secondary winding 31b. A feature of an auxiliary winding smoothing voltage (a VCC terminal voltage at a control circuit 2) which is a smoothed voltage at the auxiliary winding 31c is that the auxiliary winding smoothing voltage rises with the increase of output power. Utilizing the feature, the auxiliary winding smoothing voltage becomes a predetermined value or more, thereby allowing detection that the output power becomes a predetermined value or more. Therefore, the flyback type switching power supply device detects the overload state.

The flyback type switching power supply device disclosed in Japanese Patent Laid-open Publication No. 06-197530 has an advantage that the output power actuating the protection has weak dependence on an input voltage. The advantage is not lost in not only PWM control which is operated at a constant oscillation frequency, which will be described in the present invention, but also an RCC type power supply in which the oscillation frequency changes depending on the input voltage.

On the other hand, for a power supply in which large power needs to be instantly supplied to the output portion while the output power is maintained for a predetermined time or more, there is proposed a power supply in which the protection is actuated after a predetermined delay time is provided since an overload is detected, in order to deal with the case in which the overload protection needs to be actuated, or in order to prevent a malfunction of the overload protection.

Japanese Patent Laid-open Publication No. 2004-48884 discloses a circuit in which a hold circuit holding an overcurrent detection signal for a predetermined time is provided, whereby the protection is actuated after a predetermined delay time elapses since the overload is detected.

However, in the switching power supply device disclosed in Japanese Unexamined Patent Publication No. 06-197530 in which an overload is detected by the rise of the auxiliary winding smoothing voltage, it is necessary to take the following two methods in order to provide the delay time after the overload is detected as described above:

1) A smoothing capacitor 4 of the auxiliary winding is increased, thereby delaying the rise of the auxiliary winding smoothing voltage after the output power is increased; and 2) A circuit generating the delay time is added separately.

In the method 1), a large smoothing capacitor is required to sufficiently delay the rise of the auxiliary winding smoothing voltage, and actually a large aluminum electrolytic capacitor is required, which results in increased occupying space and cost.

In the method 2), similarly to the switching power supply device disclosed in Japanese Unexamined Patent Publication No. 06-197530, the addition of a complicated circuit is required. Therefore, the increased occupying space and cost are unavoidable in the case where the circuit is configured by discrete components. Even if a commercially available control IC is used as the control circuit 2 of the switching element 1, it is necessary to use a semiconductor IC having the function, which results in a decreased degree of freedom in design.

SUMMARY OF THE INVENTION

In order to achieve the foregoing object, a switching power supply device according to a first aspect of the present invention includes: a transformer having a first winding, a second winding, and a third winding; a switching element connected in series to the first winding; a control circuit which controls a switching operation of the switching element; a potential clamp circuit connected to the third winding and a delay generation capacitor, the third winding being equal in polarity to the second winding, the potential clamp circuit supplying power to the delay generation capacitor when one of potentials at the third winding becomes a predetermined value or more; and the delay generation capacitor connected to the potential clamp circuit, wherein the control circuit includes a first overload protection unit and has a function of actuating overload protection when a potential at the delay generation capacitor becomes a predetermined value or more.

In order to achieve the foregoing object, a switching power supply device according to a second aspect of the present invention is the switching power supply according to the first aspect of the present invention, wherein the first overload protection unit included in the control circuit may be a latch stop type.

In order to achieve the foregoing object, a switching power supply device according to a third aspect of the present invention is the switching power supply according to the first aspect of the present invention, wherein the first overload protection unit included in the control circuit may be a self-reset type.

In order to achieve the foregoing object, a switching power supply device according to a fourth aspect of the present invention is the switching power supply according to the first aspect of the present invention, wherein the first overload protection unit included in the control circuit may set a period during which the switching element performs the switching operation to a predetermined ratio or less compared with a period during which the switching element does not perform the switching operation.

In order to achieve the foregoing object, a switching power supply device according to a fifth aspect of the present invention is the switching power supply according to the first aspect of the present invention, which may further include a discharging unit for discharging the delay generation capacitor.

In order to achieve the foregoing object, a switching power supply device according to a sixth aspect of the present invention is the switching power supply according to the fifth aspect of the present invention, wherein the discharging unit for discharging the delay generation capacitor may be a resistor.

In order to achieve the foregoing object, a switching power supply device according to a seventh aspect of the present invention is the switching power supply according to the first aspect of the present invention, wherein a resistor may be connected in series to the potential clamp circuit.

In order to achieve the foregoing object, a switching power supply device according to an eighth aspect of the present invention is the switching power supply according to the first aspect of the present invention, wherein a first diode may be connected in series to the potential clamp circuit.

In order to achieve the foregoing object, a switching power supply device according to a ninth aspect of the present invention is the switching power supply according to the first aspect of the present invention, wherein the potential clamp circuit may be configured such that a second diode and a Zener diode are connected in series with their polarities opposite to each other.

In order to achieve the foregoing object, a switching power supply device according to a tenth aspect of the present invention is the switching power supply according to the ninth aspect of the present invention, wherein a resistor may be inserted to be connected in series to the Zener diode and the second diode.

In order to achieve the foregoing object, a switching power supply device according to an eleventh aspect of the present invention is the switching power supply according to the ninth aspect of the present invention, wherein a third diode may be inserted in a direction identical to that of the first diode to be connected in series to the Zener diode and the second diode.

In order to achieve the foregoing object, a switching power supply device according to a twelfth aspect of the present invention is the switching power supply according to the ninth aspect of the present invention, wherein one or a plurality of Zener diodes may be inserted to be connected in series to the Zener diode and the second diode.

In order to achieve the foregoing object, a switching power supply device according to a thirteenth aspect of the present invention is the switching power supply according to the ninth aspect of the present invention, wherein one or a plurality of Zener diodes may be inserted to be connected in series to the Zener diode and the second diode.

In order to achieve the foregoing object, a switching power supply device according to a fourteenth aspect of the present invention is the switching power supply according to the first aspect of the present invention, wherein, in the control circuit, a unit detecting a potential at the delay generation capacitor may be shared by a power supply unit of the control circuit.

In order to achieve the foregoing object, a switching power supply device according to a fifteenth aspect of the present invention is the switching power supply according to the first aspect of the present invention, which may further include output detection unit for detecting an output state of the second winding, wherein the control circuit may include a feedback unit into which an output signal of the output detection unit is fed, and the feedback unit may have a function of detecting that a potential at the delay generation capacitor becomes a predetermined value or more.

In order to achieve the foregoing object, a switching power supply device according to a sixteenth aspect of the present invention includes: a transformer having a first winding, a second winding, and a third winding; a switching element connected in series to the first winding; a control circuit which controls a switching operation of the switching element; a potential clamp circuit connected to the third winding and a delay generation capacitor, the third winding being equal in polarity to the second winding, the potential clamp circuit supplying power to the delay generation capacitor when one of potentials at the third winding becomes a predetermined value or more; and the delay generation capacitor connected to the potential clamp circuit, wherein the control circuit includes second overload detection unit which is different from first overload detection unit, the first overload detection unit being configured by a function of actuating overload protection when a potential at the delay generation capacitor becomes a predetermined value or more.

In order to achieve the foregoing object, a switching power supply device according to a seventeenth aspect of the present invention is the switching power supply according to the sixteenth aspect of the present invention, wherein the second overload detection unit may be a method for detecting that an output voltage at the second winding is lowered.

In order to achieve the foregoing object, a switching power supply device according to an eighteenth aspect of the present invention is the switching power supply according to the sixteenth aspect of the present invention, wherein the second overload detection unit may be a method for detecting a current passed through the switching element becomes a predetermined value or more.

In order to achieve the foregoing object, a switching power supply device according to a nineteenth aspect of the present invention is the switching power supply according to the sixteenth aspect of the present invention, which may further include output detection unit for detecting an output state of the second winding, wherein the control circuit may include a feedback unit into which an output signal of the output detection unit is fed, a signal fed into the feedback unit may be a current signal, and the second overload detection unit may be a method for detecting that the current signal becomes zero or a predetermined value or less.

In order to achieve the foregoing object, a switching power supply device according to a twentieth aspect of the present invention is the switching power supply according to the nineteenth aspect of the present invention, wherein, in the control circuit, the second overload detection unit may be a method in which a constant current source is connected to the feedback unit and a potential at the feedback unit becomes a predetermined value or more, thereby detecting overload protection.

In order to achieve the foregoing object, a switching power supply device according to a twenty-first aspect of the present invention is the switching power supply according to any one of the sixteenth to twentieth aspects of the present invention, wherein the control circuit unit may include second overload protection unit which is different from the first overload protection unit, the first overload protection unit may actuate overload protection when the first overload detection unit detects an overload, and the second overload protection unit may actuate overload protection when the second overload detection unit detects an overload.

In order to achieve the foregoing object, a switching power supply device according to a twenty-second aspect of the present invention is the switching power supply according to any one of the sixteenth to twentieth aspects of the present invention, wherein, in the control circuit unit, the first overload protection unit may actuate overload protection, when the first overload detection unit detects an overload, or when the second overload detection unit detects an overload.

In order to achieve the foregoing object, a switching power supply device according to a twenty-third aspect of the present invention is the switching power supply according to the twenty-second aspect of the present invention, wherein, in the control circuit unit, the feedback unit may have a function of detecting that a potential at the delay capacitor becomes a predetermined value or more using the first overload detection unit.

In order to achieve the foregoing object, a switching power supply device according to a twenty-fourth aspect of the present invention is the switching power supply according to the any one of the first to twenty-third aspects of the present invention, wherein a portion or the whole of the control circuit unit may be configured on a semiconductor substrate.

In order to achieve the foregoing object, a switching power supply device according to a twenty-fifth aspect of the present invention is the switching power supply according to the any one of the first to twenty-third aspects of the present invention, wherein a portion or the whole of the control circuit unit and the switching element may be configured on an identical semiconductor substrate.

In order to achieve the foregoing object, a method according to a twenty-sixth aspect of the present invention for detecting an overload in a switching power supply which includes: a transformer having a first winding, a second winding, and a third winding; a switching element connected in series to the first winding; a control circuit which controls a switching operation of the switching element, the control circuit including first overload protection unit; a potential clamp circuit connected to the third winding and a delay generation capacitor, the third winding being equal in polarity to the second winding; and the delay generation capacitor connected to the potential clamp circuit, includes the step of: detecting that, in an overload state, only a portion of a pulse emerging in a change in one of potentials at the third winding becomes higher than a predetermined value set in the potential clamp circuit, and that a potential at the delay generation capacitor with which power of only the portion of the pulse is charged rises.

In order to achieve the foregoing object, a method according to a twenty-seventh aspect of the present invention for performing overload protection may utilize: a second overload detection method that is different from the overload detection method according to the twenty-sixth aspect; and the overload detection method according to the twenty-sixth aspect.

In order to achieve the foregoing object, a method according to a twenty-eighth aspect of the present invention for performing overload protection is a method according to the twenty-seventh aspect of the present invention for performing overload protection, wherein the second overload detection method may be a method for detecting that a voltage at an output portion of the second winding is lowered.

In order to achieve the foregoing object, a method according to a twenty-ninth aspect of the present invention for performing overload protection is a method according to the twenty-seventh aspect of the present invention for performing overload protection, wherein the second overload detection method may be a method for detecting that a current passed through the switching element becomes a predetermined value or more.

In order to achieve the foregoing object, a method according to a thirtieth aspect of the present invention for performing overload protection is a method according to the twenty-seventh aspect of the present invention for performing overload protection, wherein the overload protection may be performed by identical overload protection unit, when an overload is detected by the overload detection method according to the twenty-sixth aspect, and when an overload is detected by the second overload detection method.

In order to achieve the foregoing object, a method according to a thirty-first aspect of the present invention for performing overload protection is a method according to the twenty-seventh aspect of the present invention for performing overload protection, which may include two different overload protection unit, wherein the overload protection may be performed by one of the different overload protection unit when an overload is detected by the overload detection method according to the twenty-fifth aspect, and the overload protection may be performed by the other overload protection unit when an overload is detected by the second overload detection method.

Accordingly, the overload protection having the sufficient delay time and the weak dependence of the output power detecting an overload on the input voltage can be realized by a few additional components and a small capacitor. That is, cost reduction and space-saving can be realized in the switching power supply device including the overload protection function having a sufficient delay time. Even in the case where the switching element is controlled and driven to design the power supply by utilizing a commercially available semiconductor control IC, any control IC may be used as long as the control IC has one terminal which actuates the protection when the voltage at the terminal rises.

BRIEF DESCRIPTION OF THE DRAWINGS

The present invention will become readily understood from the following description of preferred embodiments thereof made with reference to the accompanying drawings, in which like parts are designated by like reference numeral and in which.

DETAILED DESCRIPTION OF THE PREFERRED EMBODIMENTS

Figure 1:
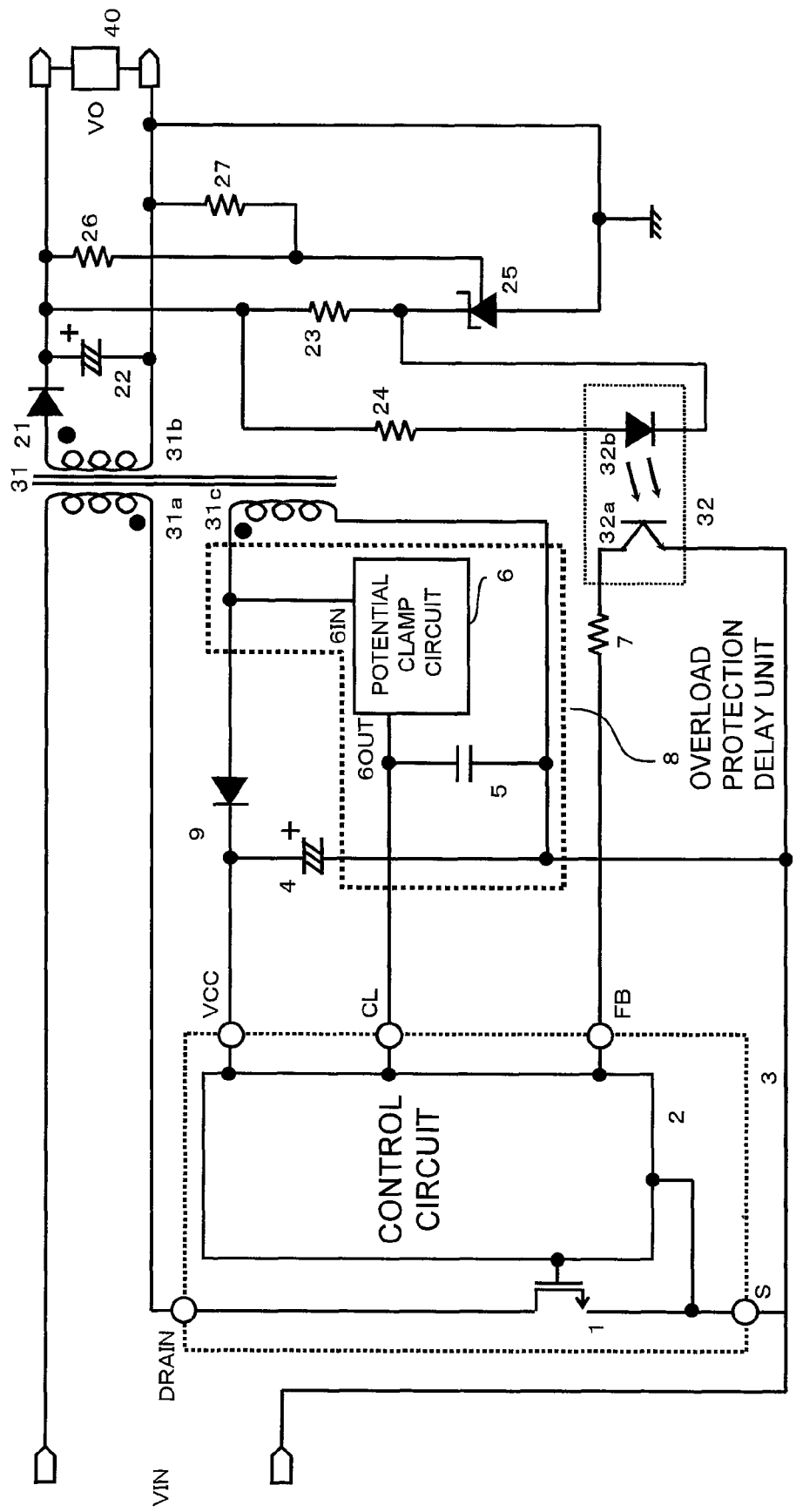
FIG. 1 is a block diagram showing a configuration of a switching power supply device according to an embodiment of the present invention.

A switching power supply device according to an embodiment of the present invention will specifically be described below with reference to the drawings. FIG. 1 is a circuit diagram of the switching power supply device showing a configuration of the switching power supply device according to the embodiment of the present invention.

In FIGS. 1, 2, 6-10, 12-14, 16, 17, 19, 20, and 21, embodiments of the present invention and a conventional example are illustrated, and portions playing the same role in the drawings are designated by the same reference numerals.

Referring to FIG. 1, a semiconductor device 3 for controlling the switching power supply device includes a switching element 1 and a control circuit 2 which controls the switching operation of the switching element 1. The semiconductor device 3 includes five terminals as external input terminals, i.e., an input terminal (DRAIN terminal) of the switching element 1, an auxiliary power supply voltage input terminal (VCC terminal), an operation stop signal input terminal (CL terminal), an FB terminal, and a control circuit GND terminal (SOURCE terminal) which is also used as an output terminal of the switching element 1.

A transformer 31 includes a primary winding 31a, a secondary winding 31b, and an auxiliary winding 31c. The primary winding 31a is opposite from the secondary winding 31b in polarity, and the switching power supply device is a flyback type. The auxiliary winding 31c is equal to the secondary winding 31b in polarity.

A rectification smoothing circuit including a diode 9 and a capacitor 4 is connected to the auxiliary winding 31c, and the rectification smoothing circuit acts as an auxiliary power supply unit of the semiconductor device 3. That is, the auxiliary power supply unit rectifies and smoothes an alternating current (auxiliary-side alternating voltage) generated in the auxiliary winding 31c by the switching operation of the switching element 1 and generates an auxiliary power supply voltage VCC, which is proportional to an output voltage VO, to apply the auxiliary power supply voltage VCC to the VCC terminal.

A potential clamp circuit 6 is connected to the auxiliary winding 31c. The potential clamp circuit 6 outputs power that has been fed into its input portion 6IN from an output portion 6OUT only when a predetermined voltage is applied to the input portion 6IN of the potential clamp circuit 6.

A photocoupler 32 is a control signal transmission circuit that transmits a control signal from the secondary side to the primary side and includes a phototransistor 32a and a photodiode 32b.

A resistor 7 and the phototransistor 32a of the photocoupler 32 are connected in series between the FB terminal and the SOURCE terminal. The semiconductor device 3 adjusts supply of output power PO by changes in a current passed through the phototransistor 32a, i.e., a current passed from the FB terminal, thereby keeping the output voltage VO constant.

A rectification smoothing circuit includes a diode 21 and a capacitor 22 and is connected to the secondary winding 32b. The rectification smoothing circuit acts as an output voltage generation unit of the switching power supply device. That is, the output voltage generation unit rectifies and smoothes an alternating current (secondary-side alternating voltage) generated in the secondary winding 31b by the switching operation of the switching element 1 and generates the output voltage VO (second direct-current voltage) to apply the output voltage VO to a load 40.

A shunt regulator 25 and resistors 26 and 27 detect the output voltage VO, and the shunt regulator 25 changes the current passed through the photodiode 32b of the photocoupler 32 according to the output voltage VO.

Figure 2:
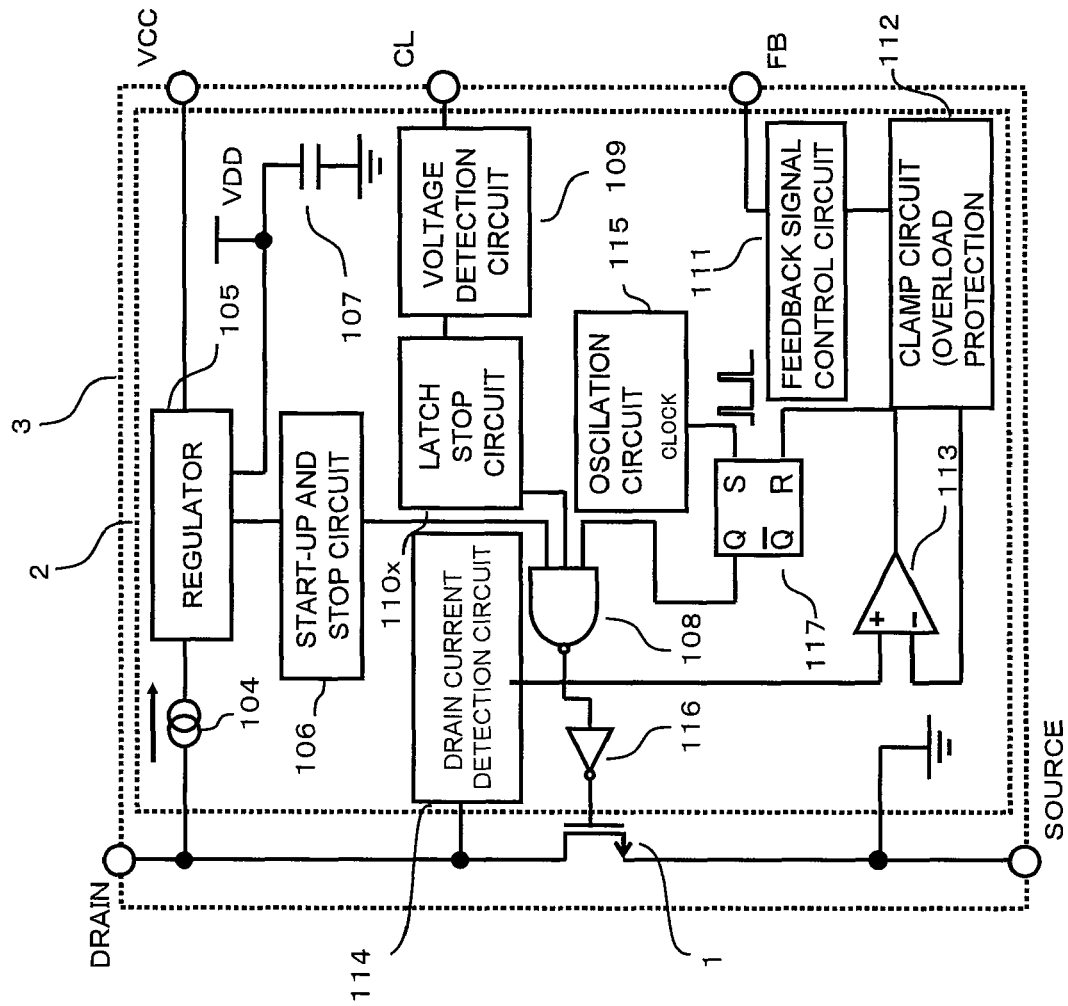
FIG. 2 is a block diagram showing a configuration of a semiconductor device for controlling the switching power supply device of the embodiment.

FIG. 2 is a block diagram showing a configuration of the semiconductor device 3 that configures the switching power supply device for controlling the same according to the embodiment. Referring to FIG. 2, a regulator 105 supplies a current from one of the DRAIN terminal and the VCC terminal to an internal circuit power supply VDD of the semiconductor device 3 to stabilize the voltage at the internal circuit power supply VDD at a constant value.

For example, the VDD voltage is kept constant by the following method.

Before the switching operation of the switching element 1 is started, the regulator 105 supplies a current to the internal circuit power supply VDD and a VDD retaining capacitor 107 from the DRAIN terminal through a constant current source 104 and supplies a current to the capacitor 4 of the auxiliary power supply unit through the VCC terminal, thereby increasing the voltages at the auxiliary power supply voltage VCC and the internal circuit power supply VDD. When the VCC voltage reaches a constant value VCC(ON), an output signal supplied from a start-up and stop circuit 106 to an NAND circuit 108 is switched from a signal at a low level (hereinafter referred to as a low-level signal) to a signal at a high level (hereinafter referred to as a high-level signal) to start the switching operation of the switching element 1. At the same time, the regulator 105 stops the current supply from the DRAIN terminal to the VCC terminal to start the current supply from the VCC terminal to the internal circuit power supply VDD. That is, when the auxiliary power supply voltage VCC becomes a predetermined value or more, the regulator 105 supplies a current from the VCC terminal to the internal circuit power supply VDD to reduce power consumption of the semiconductor device 3. When the output voltage VO is decreased, e.g., during the overload to lower the auxiliary power supply voltage VCC to a predetermined value VCC(OFF) or less, the regulator 105 supplies a current again from the DRAIN terminal to the internal circuit power supply VDD.

A voltage detection circuit 109 supplies an actuation signal to a latch stop circuit 110x when the voltage at the CL terminal becomes a predetermined value VCL(OL) or more. When the actuation signal is fed into the latch stop circuit 110x, the latch stop circuit 110x continuously supplies the low-level signal to the NAND circuit 108 to put the semiconductor device 3 into a latch stop state, thereby actuating the overload protection.

The latch stop circuit 110x does not supply the low-level signal only when the VCC and VDD are decreased in association with the decrease in input voltage VIN and the VDD becomes a predetermined value or less. That is, the stop state is maintained until the input voltage VIN is lowered.

A feedback signal control circuit 111 supplies a low voltage signal to a comparator 113 through a clamp circuit 112 as the current flowing out from the FB terminal increases, and supplies a high voltage signal to the comparator 113 through the clamp circuit 112 as the current flowing out from the FB terminal decreases.

The clamp circuit 112 determines a maximum value of the voltage signal supplied from the feedback signal control circuit 111, whereby an output signal of the feedback signal control circuit 111 is limited to a predetermined value or less. The output signal is fed from the feedback signal control circuit 111 into the comparator 113 with no change as long as the voltage signal is lower than the predetermined value. Using the clamp voltage value, the clamp circuit 112 determines a maximum value ILIMIT of a peak value of a current (hereinafter referred to as a drain current) ID passed through the switching element 1.

A drain current detection circuit 114 detects the drain current ID to supply a voltage signal to the comparator 113. The voltage signal is proportional to the drain current ID. The comparator 113 supplies a high-level signal to a reset terminal of an RS flip-flop circuit 117 when the output signal of the drain current detection circuit 114 is equal to the output signal of the clamp circuit 112.

An oscillation circuit 115 supplies a pulse voltage signal CLOCK having a constant cycle to a set terminal of the RS flip-flop circuit 117. In the RS flip-flop circuit 117, the output signal of the comparator 113 is fed into the reset terminal, and the CLOCK signal is fed into the set terminal. Therefore, the RS flip-flop circuit 117 supplies the high-level signal to the NAND circuit 108 until the output signal of the comparator 113 becomes a high level since the CLOCK signal rises.

The NAND circuit 108 supplies the low-level signal to a gate driver 116 to turn on the switching element 1 when all the input signals are at a high level.

The above-described configuration realizes so-called current-mode PWM control in which a peak value IDP of the drain current ID is controlled by the current flowing out from the FB terminal. The clamp circuit 112 functions to define the maximum value ILIMIT of the IDP. The overload protection is actuated when a voltage not lower than VCL(OL) is fed into the CL terminal.

The switching power supply shown in FIG. 1 is an example of the power supply circuit in which the semiconductor device 3 which is the switching power supply control IC shown in FIG. 2 is used.

In the switching power supply of FIG. 1, the shunt regulator 25 detects a slight change in output voltage VO, and the currents passed through the photodiode 32b and the phototransistor 32a and the current IFB flowing out from the FB terminal are changed to change the peak value IDP of the current or the drain current passed through the switching element. Therefore, the control is performed such that the output voltage VO is substantially kept constant even if the output power is changed. That is, when the output power is increased to slightly decrease the VO, the FB terminal current IFB is decreased while the peak value IDP of the drain current is increased. On the contrary, when the output power is decreased to slightly raise the VO, the FB terminal current IFB is increased while the peak value IDP of the drain current is decreased.

Figure 3:
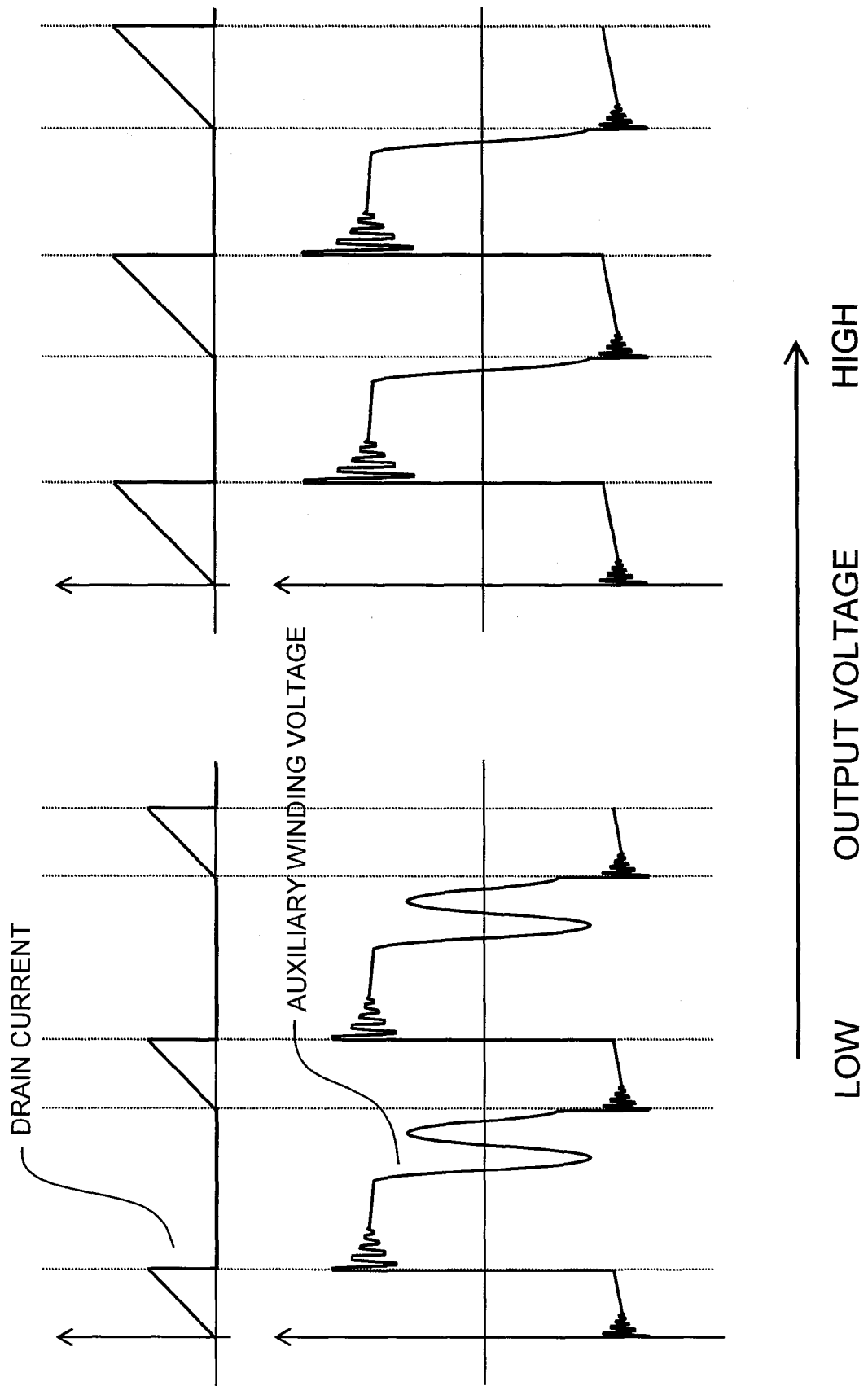
FIG. 3A shows changes of a drain current and an auxiliary winding voltage in small output power of the switching power supply device of the embodiment.
FIG. 3B shows changes of the drain current and auxiliary winding voltage when the output power is larger than that of FIG. 3A.

FIGS. 3A and 3B show changes in auxiliary winding voltages of the switching power supply. As used herein, the auxiliary winding voltage shall mean a difference in potential between the input terminal 6IN of the potential clamp circuit 6 and the GND potential. In the change in voltage shown in FIG. 3A, the output power is small compared with the change in voltage shown in FIG. 3B. As shown in FIGS. 3A and 3B, ringing is generated in the auxiliary winding voltage when the switching element 1 is turned off. The peak of the drain current rises with the increase in output power, and the peak pulse of the ringing is also increased.

Figure 4:
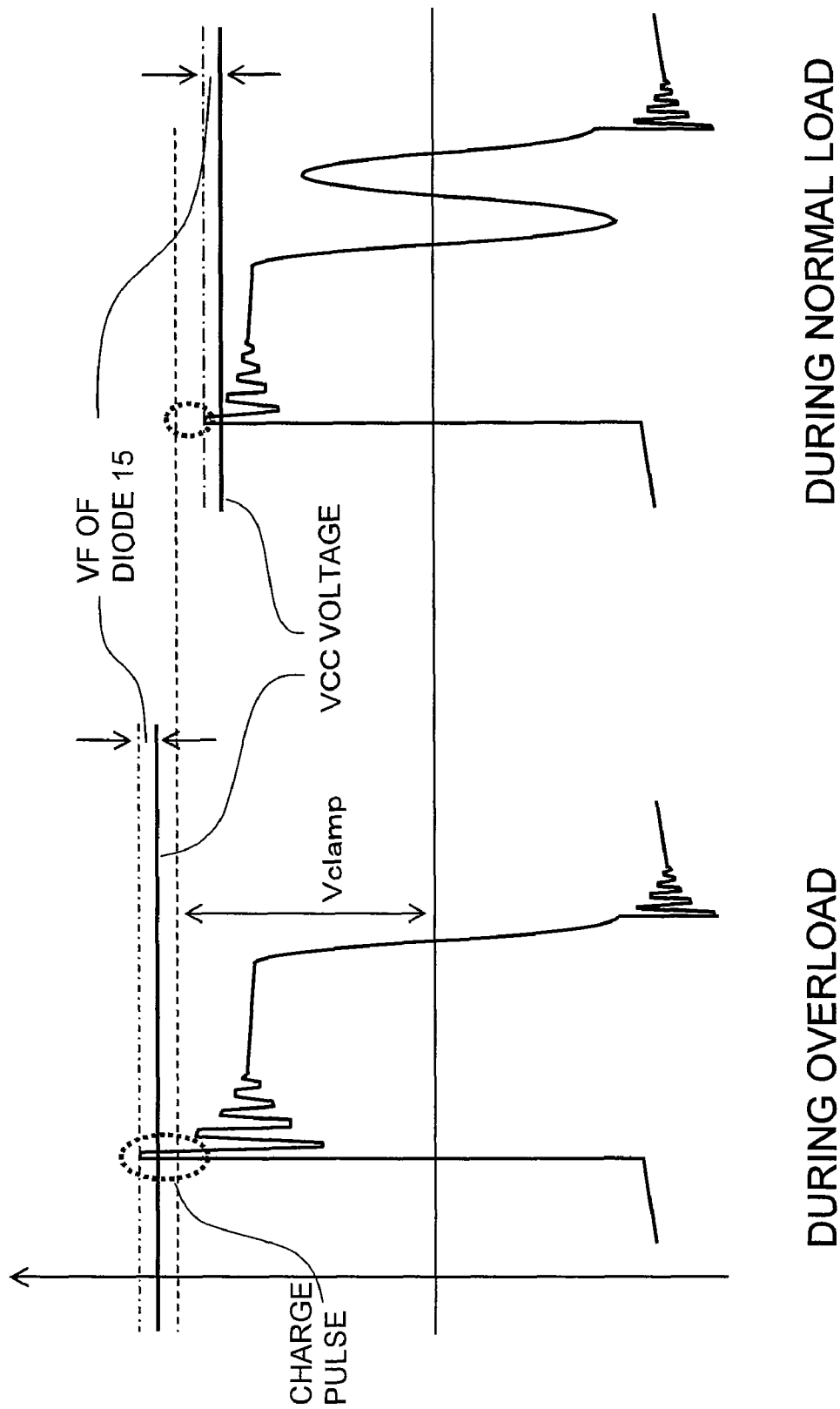
FIG. 4A shows a change in auxiliary winding voltage during an overload of the switching power supply device of the embodiment.
FIG. 4B shows a change in auxiliary winding voltage during a normal load.

FIGS. 4A and 4B show enlarged auxiliary winding voltages. In the figures, when a voltage which is not lower than a clamp voltage Vclamp is applied to the potential clamp circuit 6, the capacitor 5 is charged with the energy of the voltage.

FIG. 4B shows the auxiliary winding voltage during a normal load. During the normal load, because the ringing peak emerging at turning off of the switching element 1 does not reach the Vclamp, the capacitor 5 is not charged nor the CL terminal voltage VCL rises.

On the other hand, FIG. 4B shows the auxiliary winding voltage during an overload. During the overload, the ringing peak of the auxiliary winding voltage becomes higher with the increase in output power and is higher than the Vclamp. Therefore, the capacitor 5 is charged by the pulse of the auxiliary winding voltage which is higher than the Vclamp. When the overload state is continued, the potential rises gradually at the capacitor 5. When the potential VCL at the CL terminal rises to the VCL(OL), an actuation signal is fed into the overload protection actuation circuit in the control circuit 2 to actuate the overload protection. The letters VCC in FIGS. 4A and 4B designate a voltage at the VCC terminal, and the VCC voltage is expressed by a value which is lower by the VF of the diode 9 than the ringing peak value of the auxiliary winding voltage.

For the purpose of facilitating understanding of the description, FIGS. 4A and 4B show waveforms of the auxiliary winding voltages in the state where the voltage is not clamped by the potential clamp circuit 6. However, in reality, the auxiliary winding voltage becomes a waveform in which the auxiliary winding voltage is clamped at the Vclamp in a period during which the auxiliary winding voltage is higher than the Vclamp.

Figure 5:
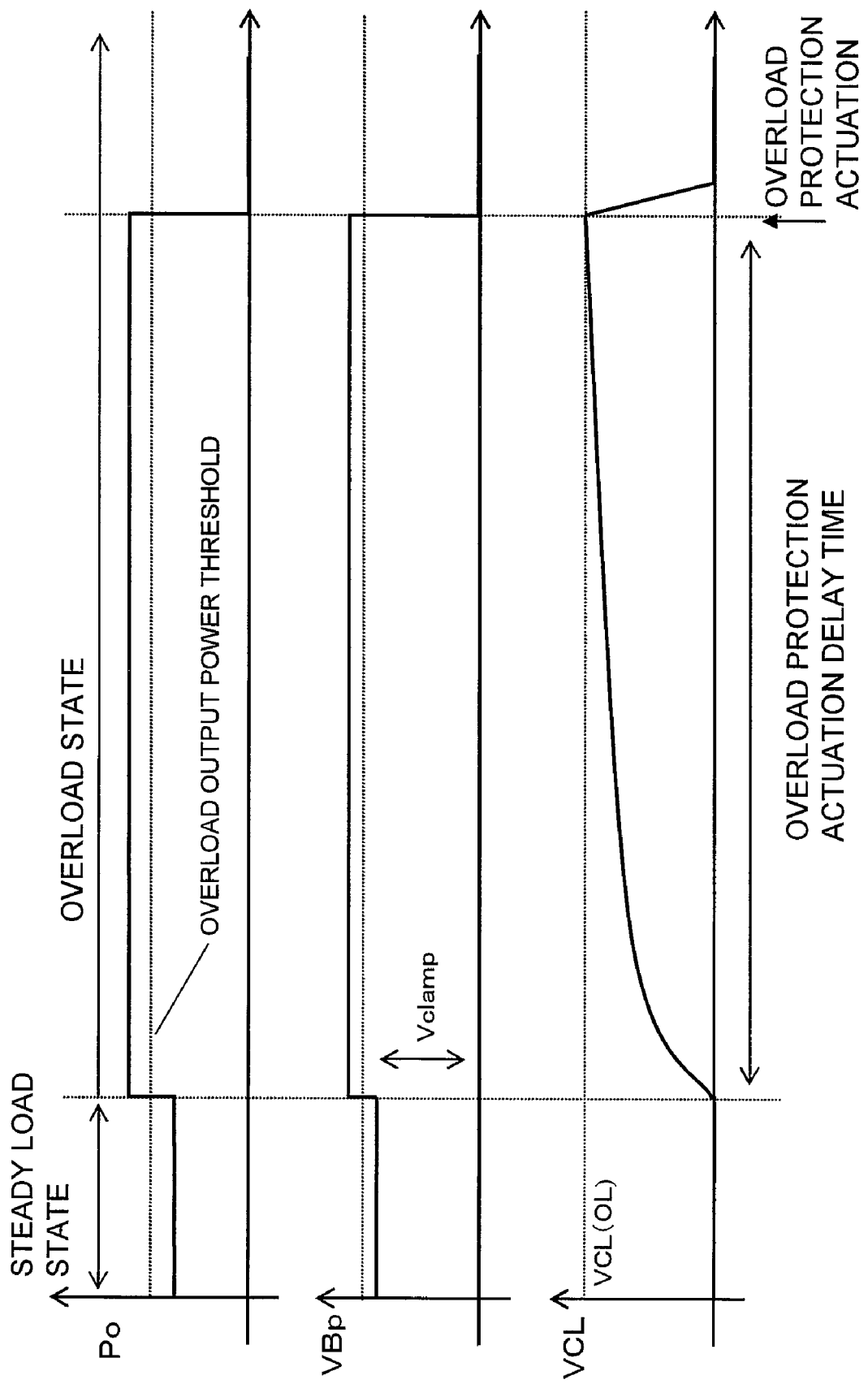
FIG. 5 is a timing chart showing an operation during the overload of the switching power supply device of the embodiment.

FIG. 5 is a timing chart showing an operation during the overload protection. When transition is made from a steady load state to an overload state, a peak value VBp of the auxiliary winding voltage also rises with increasing output power, and the capacitor 5 is charged to start the rise of the VCL. When the VCL rises to the VCL(OL), the overload protection is actuated, and a time taken for the VCL to rise to the VCL(OL) becomes the delay time of the overload protection. As described above, in this circuit, the capacitor 5 is charged only for the time in which the ringing pulse exceeds the Vclamp during the overload state, so that the rise of the VCL can be delayed to lengthen the delay time.

The length of the delay time is considered by the comparison with the case in which the potential clamp circuit 6 is connected to, e.g., the VCC which is the smoothed voltage to charge the capacitor 5. It is assumed that a (case 1) is the case in which the potential clamp circuit 6 is connected to the VCC to set the Vclamp to a value that is lower than the VCC in the overload state by a predetermined value u. It is assumed that a (case 2) is the case in which the potential clamp circuit 6 is connected to the auxiliary winding to set the Vclamp to a value that is lower than the VBp in the overload state by the value u. It is also assumed that the capacitor 5 has the same value in both the (case 1) and the (case 2).

In the (case 1), the VCC voltage is always higher than the Vclamp, and the charge current flows continuously to the capacitor 5. On the other hand, in the (case 2), in the auxiliary winding voltage, only the ringing pulse is higher in potential than the Vclamp immediately after the switching element 1 is turned off, and the charge current flows continuously to the capacitor 5 only in that period.

Because the potential difference of u between the VCC and the Vclamp is equal to the potential difference of u between the VBp and the Vclamp, it is apparent that the time for the VCL to rise to the VCL(OL) becomes longer in the (case 2) in which the time during which the capacitor 5 is charged is shorter.

When the VCC is equal to the Vclamp in the (case 1), the output power becomes an overload output power threshold which is a threshold whether to actuate the overload protection. When the VBp is equal to the Vclamp in the (case 2), the output power becomes the overload output power threshold. Therefore, it can be thought that the above potential difference u is a design margin for actuating the output protection in both the (case 1) and the (case 2). That is, when the (case 1) and the (case 2) have an equal design margin, the longer delay time can be ensured in the (case 2).

In the (case 1), the delay time can be lengthened by decreasing the potential difference u between the VCC and the Vclamp. However, as described above, the design margin is decreased, and thus it becomes difficult to securely actuate the overload protection.

That is, in the capacitors 5 having the same value, the delay time becomes longer in the configuration of the present invention described with reference to the (case 2). In the configuration of the embodiment, the same delay time can be realized with the capacitor 5 having smaller capacitance.

Figure 6:
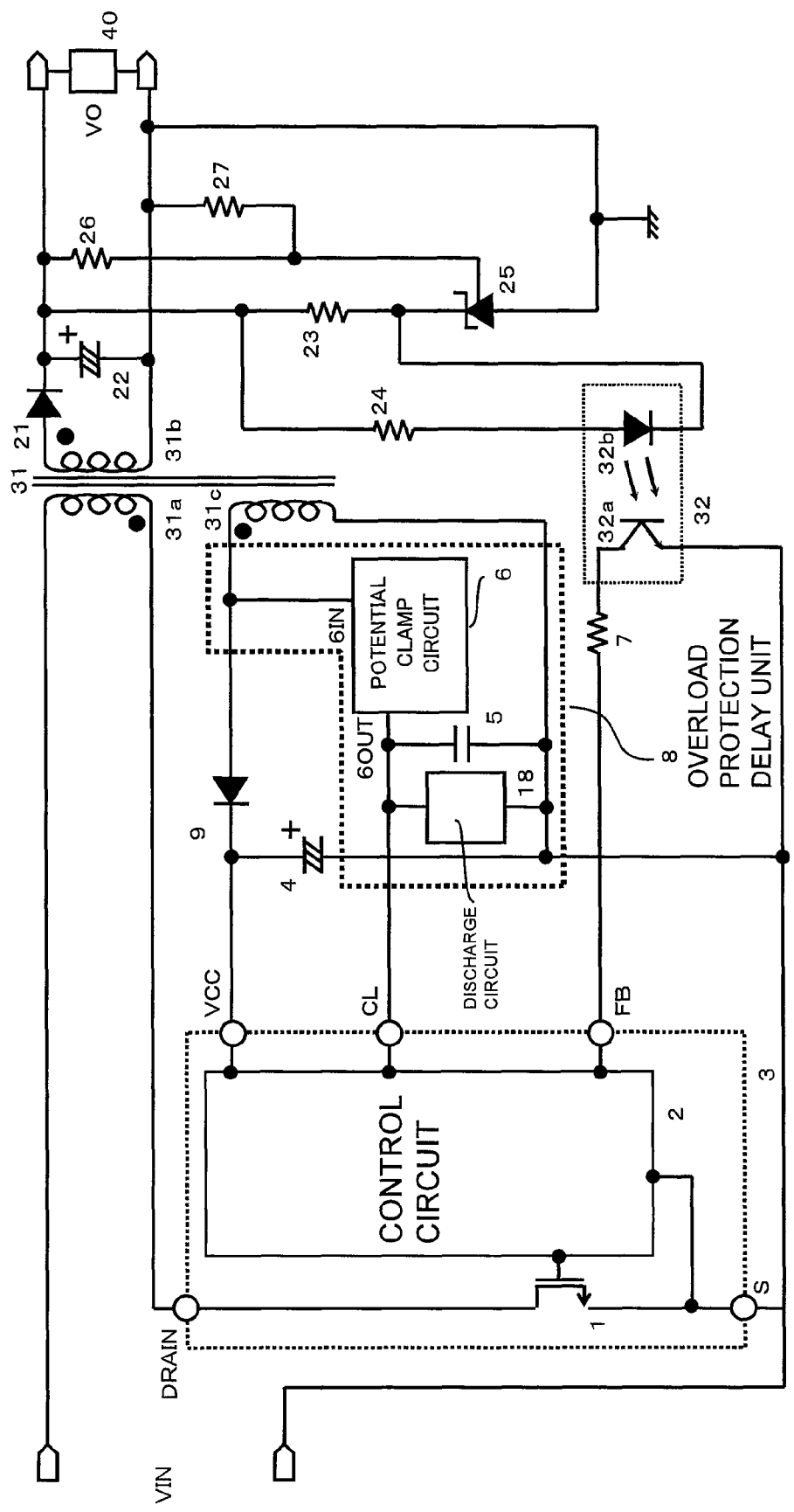
FIG. 6 is a block diagram showing a configuration of the switching power supply device according to the embodiment.

The power supply can continue the steady operation when the steady load state is resumed before the overload protection is actuated. As shown in FIG. 6, the VCL can rapidly be lowered by providing discharge unit 18 of the capacitor 5 when the steady load state is resumed before the overload protection is actuated. Therefore, the delay time can be secured even if the overload state emerges at short intervals.

The discharge function may be provided in the control circuit 2.

Figure 7:
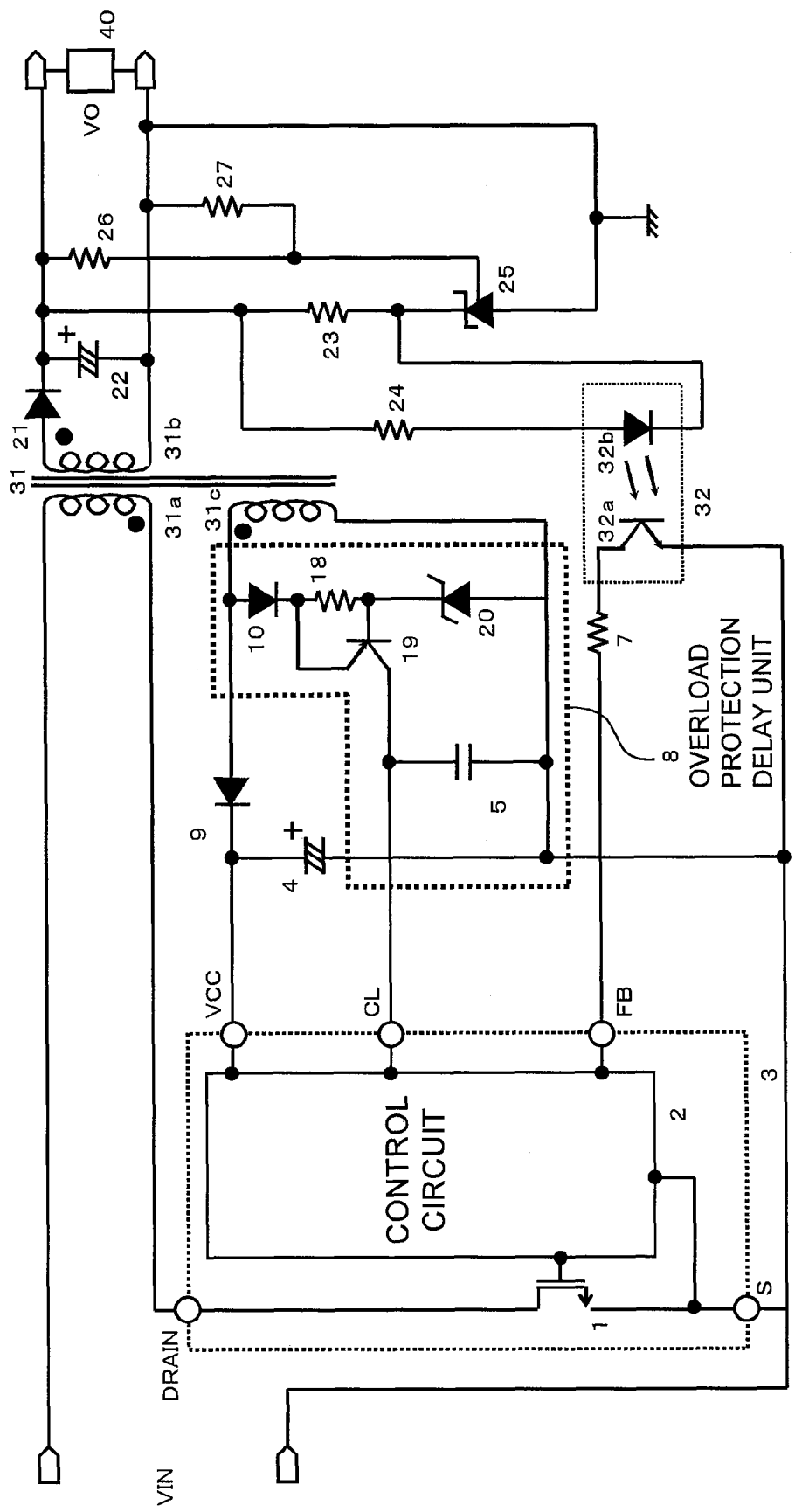
FIG. 7 is a block diagram showing a configuration of the switching power supply device of the embodiment.

As shown in, e.g., FIG. 7, the potential clamp circuit 6 can be realized with a regulator circuit including a diode 10, a resistor 18, a PNP transistor 19, and a Zener diode 20. In the regulator circuit, when a voltage that is not lower than the Vclamp set by the Zener voltage at the Zener diode 20 is applied to an anode of the diode 10, the capacitor 5 is charged with the energy of the voltage. At this point, the Vclamp is changed by the Zener voltage at the Zener diode 20 to adjust an overload output power threshold used for detecting the output power which is larger than the value as an overload state.

Figure 8:
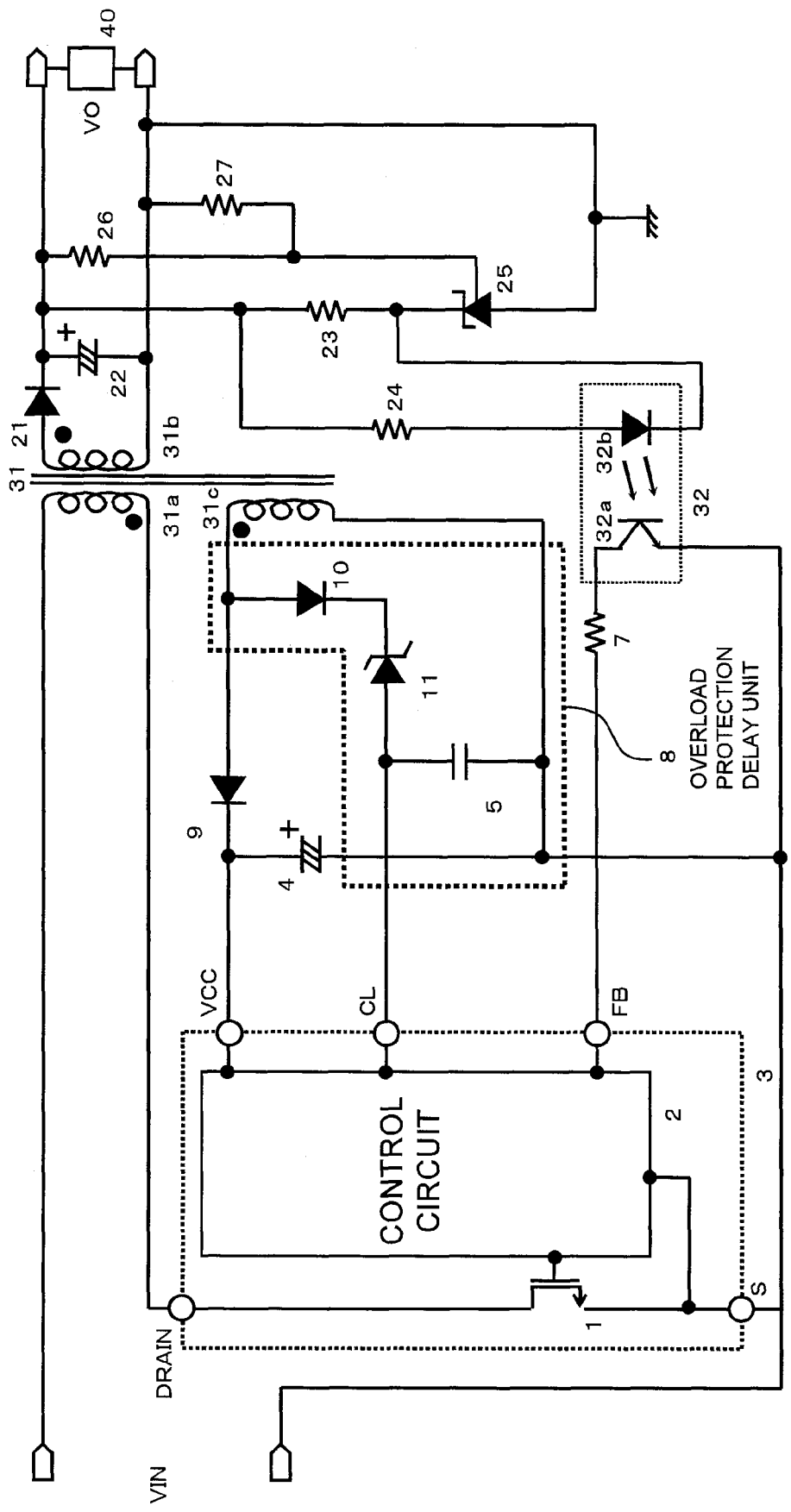
FIG. 8 is a block diagram showing a configuration of the switching power supply device according to the embodiment.

As shown in, e.g., FIG. 8, the potential clamp circuit 6 can easily be realized with a combination of the diode 10 and a Zener diode 11. At this point, the Vclamp is changed by the Zener voltage at the Zener diode 11 to adjust the overload output power threshold used for detecting the output power which is larger than the value as an overload state.

Figure 9:
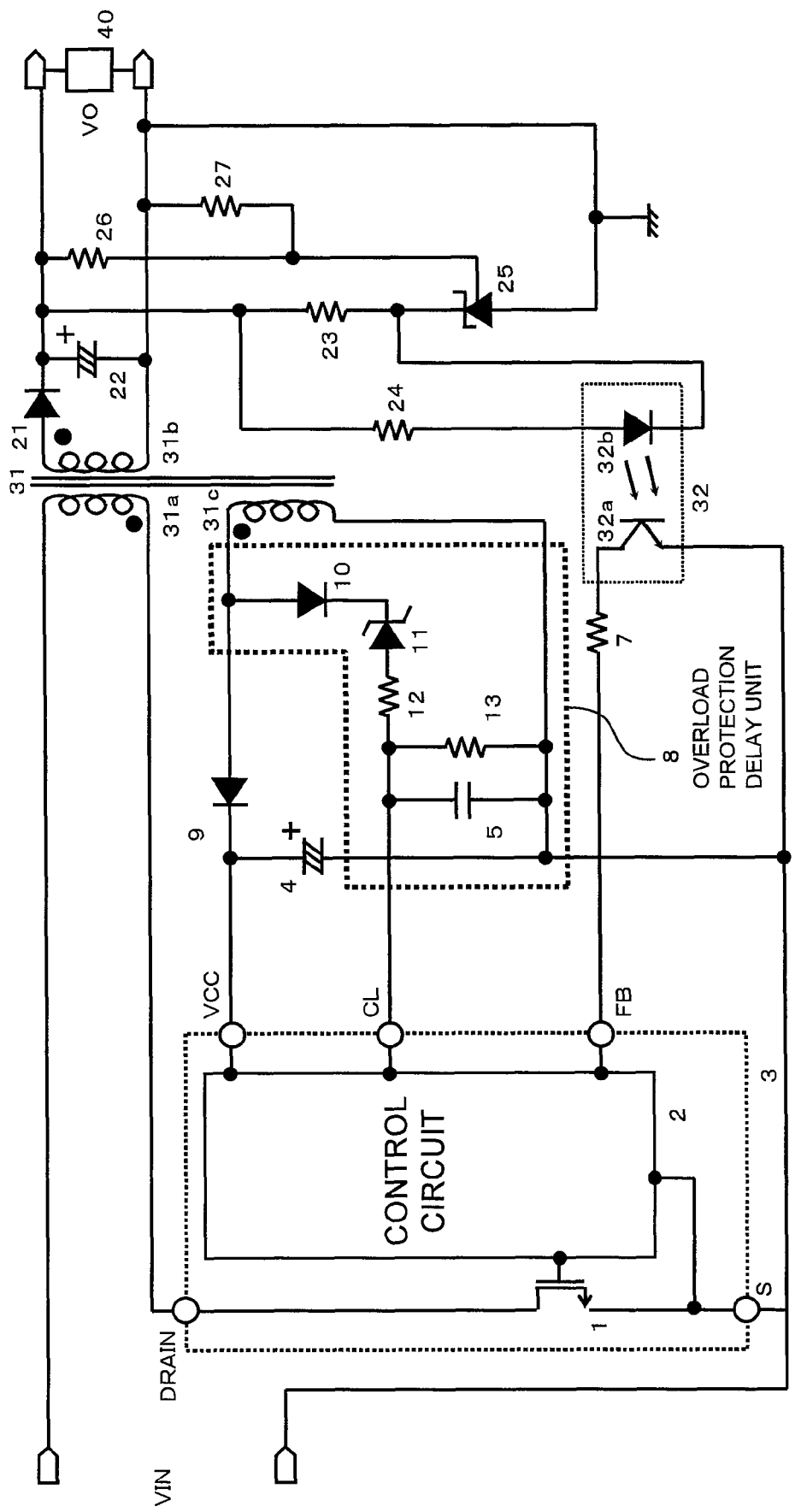
FIG. 9 is a block diagram showing a configuration of the switching power supply device according to the embodiment.

A configuration of an overload protection delay circuit as shown in FIG. 9 is proposed in order to easily adjust the overload output power threshold and the delay time. A resistor 12 functions to adjust the Vclamp. A resistor 13 functions to lengthen the delay time and also functions to discharge the capacitor 5 to lower the VCL when the overload state is resolved.

In FIG. 9, the Vclamp can be adjusted by connecting the Zener diode 11 in series to the diode 10 or by connecting one or a plurality of diodes in series to the diode 10 in the same direction as the diode 10.

The Zener diode 11 may be constituted by connecting a plurality of Zener diodes in series. Therefore, the Vclamp and a temperature characteristic can be adjusted.

While two kinds of potential clamp circuits 6 are described with reference to FIGS. 7 to 9, any configuration may be adopted as long as the potential clamp circuit 6 has the function of charging the delay capacitor 5 connected to the output portion 6OUT when a voltage that is not lower than the Vclamp is fed into the input portion 6IN.

As used herein, the overload protection shall mean that the power supplied to the output portion is set to a predetermined value or less or zero during the overload. Examples of the overload protection unit include a latch stop method in which the stop state is continued until the input voltage loweres, timer intermittent oscillation in which a switching element oscillation period is limited, and a fold-back protection method in which the output current is decreased by decreasing the supply of the output power. Any method can be adopted without any problem as long as the protection can be realized during the overload.

While the latch stop type overload protection is described in the embodiment shown in FIGS. 1 and 2, self-reset type overload protection can be also used without any problem. For example, the self-reset type overload protection can be realized in the power supply circuit of FIG. 1 in which the semiconductor element 3 of FIG. 10 is used.

Figure 10:
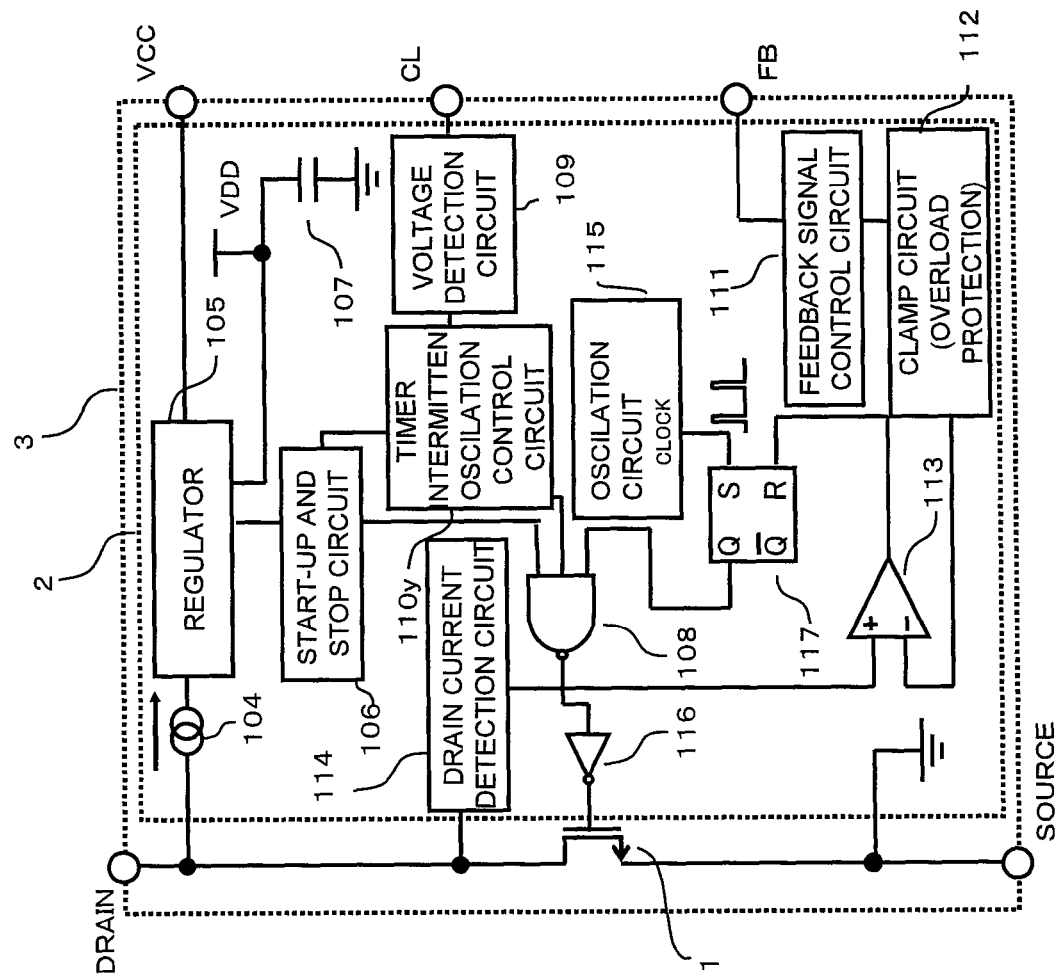
FIG. 10 is a block diagram showing a configuration of the semiconductor device for controlling the switching power supply device of the embodiment.

In the semiconductor element 3 of FIG. 10, the potential-difference detection circuit 109 and a timer intermittent oscillation control circuit 110y are connected to the CL terminal, and the timer intermittent oscillation control circuit 110y supplies a signal to the regulator 105 and the NAND circuit 108. The timer intermittent oscillation control circuit 110y has a function of supplying the low-level signal to the NAND circuit 108 to stop the switching operation of the switching element 1 when the VCL rises to the VCL(OL). The timer intermittent oscillation control circuit 110y also has a function of counting the number of times at which the VCC becomes equal to the VCC(OFF), as well as a function of not starting the switching operation of the switching element 1 even if the VCC becomes equal to the VCC(ON) when the count is from 1 to 15, a function of starting the switching operation when the count becomes 16, and a function of resetting the count to zero when the count is 16. It is assumed that the count is set to zero when the switching element 1 starts the switching operation at the start-up.

When the VCC terminal voltage VCC loweres to the VCC (OFF), the regulator circuit 105 of FIG. 10 not only supplies a current from the DRAIN terminal to the VDD terminal, but also supplies a current to the VCC terminal.

Figure 11:
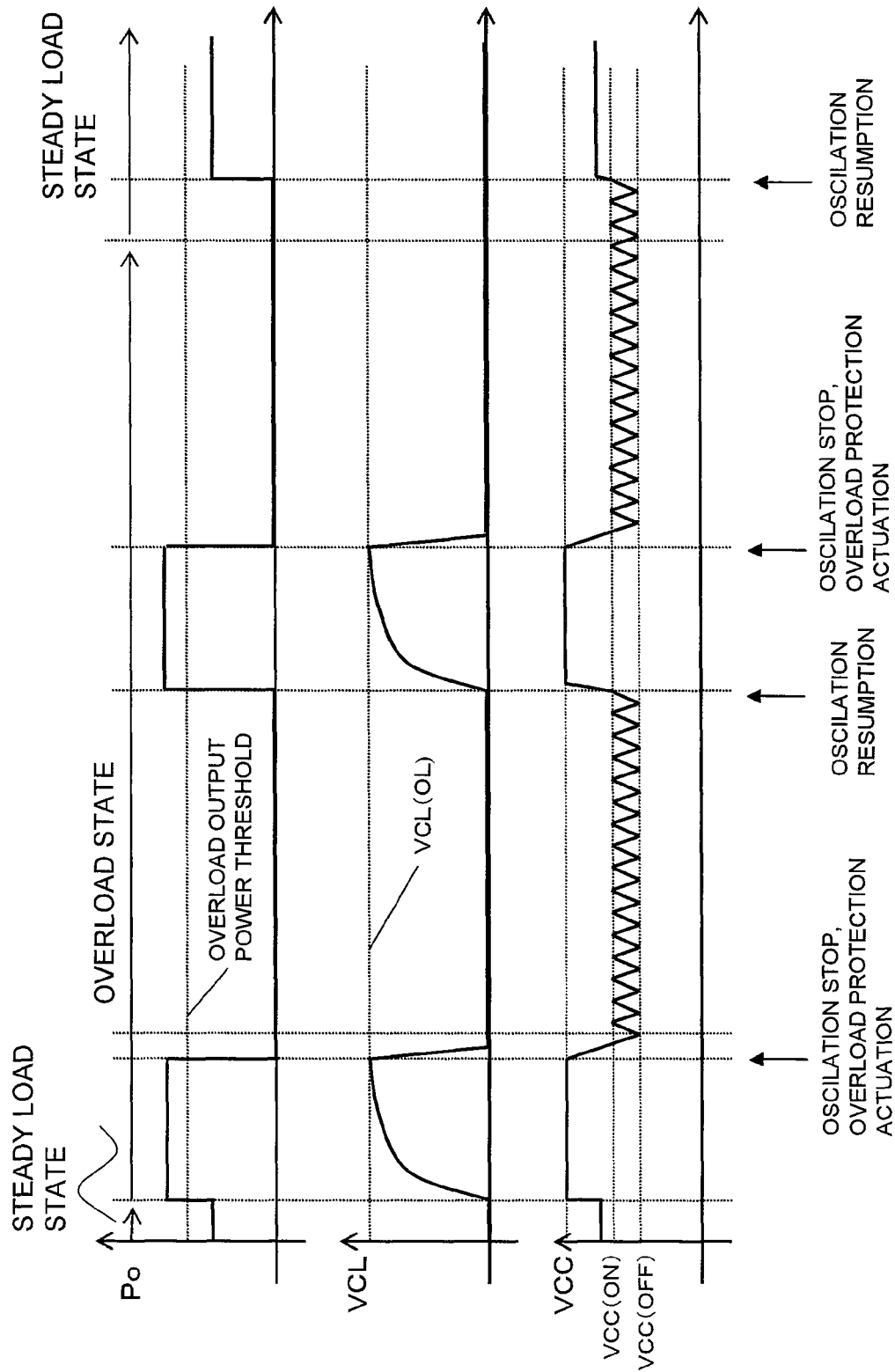
FIG. 11 is a timing chart showing an operation during an overload in the embodiment.

FIG. 11 is a timing chart showing an operation during an overload according to the present invention. In the overload state of FIG. 11, the CL terminal voltage VCL rises and becomes equal to the VCL(OL) as described earlier. At this point, the timer intermittent oscillation control circuit 110y supplies the low-level signal to the NAND circuit 108 to stop the switching operation of the switching element 1. Therefore, the VCC terminal voltage VCC is lowered with the lowering output voltage VO.

When the VCC terminal voltage is lowered to the VCC (OFF), the regulator 105 supplies a current from the DRAIN terminal to the VCC terminal, thereby starting the rise of the VCC terminal voltage.

As described above, even if the VCC becomes equal to the VCC(ON), the timer intermittent oscillation control circuit 110y has the function of not starting the switching operation when the count of the times at which the VCC becomes equal to the VCC(OFF) is from 1 to 15. Therefore, the switching operation is not resumed at this time. Because the current is not supplied from the DRAIN terminal to the VCC terminal, the VCC terminal voltage VCC falls again. When the VCC becomes equal to the VCC(OFF) again, the VCC starts to rise. As shown in FIG. 11, the VCC terminal voltage VCC is changed in a sawtooth-like manner by repeating such an operation.

After the above count of the times at which the VCC is equal to the VCC(OFF) becomes 16, the switching element 1 resumes the switching operation when the VCC becomes equal to the VCC(ON). At this point, unless the overload state is resolved, the VCL rises again to stop the switching operation, and the above-described operation is repeated. When the overload state is resolved as shown in FIG. 11, the switching power supply device can return to the normal operation.

The operation in which the supply of energy to the output portion is limited to perform the protection during an overload by limiting the period during which the switching element 1 performs switching is referred to as a timer intermittent operation. In the operation, the overload protection is referred to as the self-reset type because the switching power supply device can return to the normal operation when the overload state is resolved.

In the description above, the overload protection is performed by the latch stop or the timer intermittent oscillation. The overload protection may be performed by any method including a method for lowering a switching frequency of the switching element 1 and a method for lowering the drain current peak as long as the protection can be performed during the overload.

Although the PWM-control switching power supply is mainly described in the above embodiment, the same effect can be obtained by a switching power supply performing another operation such as PFM control and an RCC operation. Particularly, the rise of the CL terminal voltage VCL heavily depends on the output power PO rather than the drain current peak value IDp and the oscillation frequency F, and the overload output power threshold having weak input dependence can be set even in the switching power supply performing the RCC operation in which the drain current peak value IDp and the oscillation frequency F heavily depends on the input voltage at the same output power. In the aspects shown in FIGS. 1 to 11, the terminal (CL) for detecting an overload is provided in the control circuit 2. Alternatively, the same effect can also be exerted by utilizing a terminal playing another role.

Figure 14:
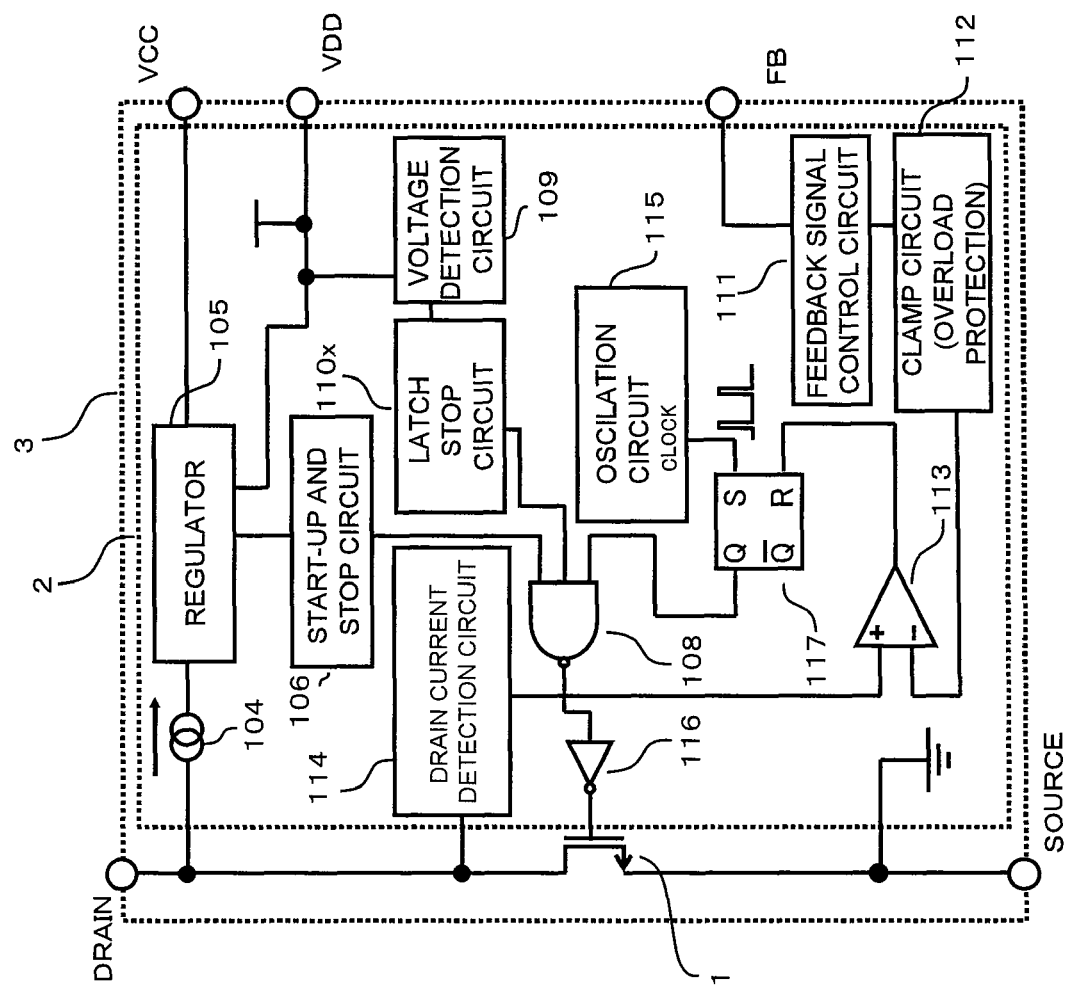
FIG. 14 is a block diagram showing a configuration of the semiconductor device for controlling the switching power supply device of the embodiment.

FIG. 14 is a circuit diagram showing the semiconductor device 3. In the semiconductor device 3 of FIG. 14, a VDD terminal is provided as a terminal of the semiconductor device 3 in order to stabilize the power supply voltage VDD in the control circuit 2, and the power supply voltage VDD is supplied from the VDD terminal. In this circuit diagram, the voltage detection circuit 109 is connected to the VDD terminal, and the voltage detection circuit is connected to the latch stop circuit 110x. Therefore, the VDD terminal acts as the CL terminal of the aspects shown in FIGS. 1 to 11. That is, when the VDD terminal voltage rises to a predetermined value VDD(OL), the latch stop circuit 110x latches and stops the switching operation of the switching element 1 to actuate the overload protection.

Figure 13:
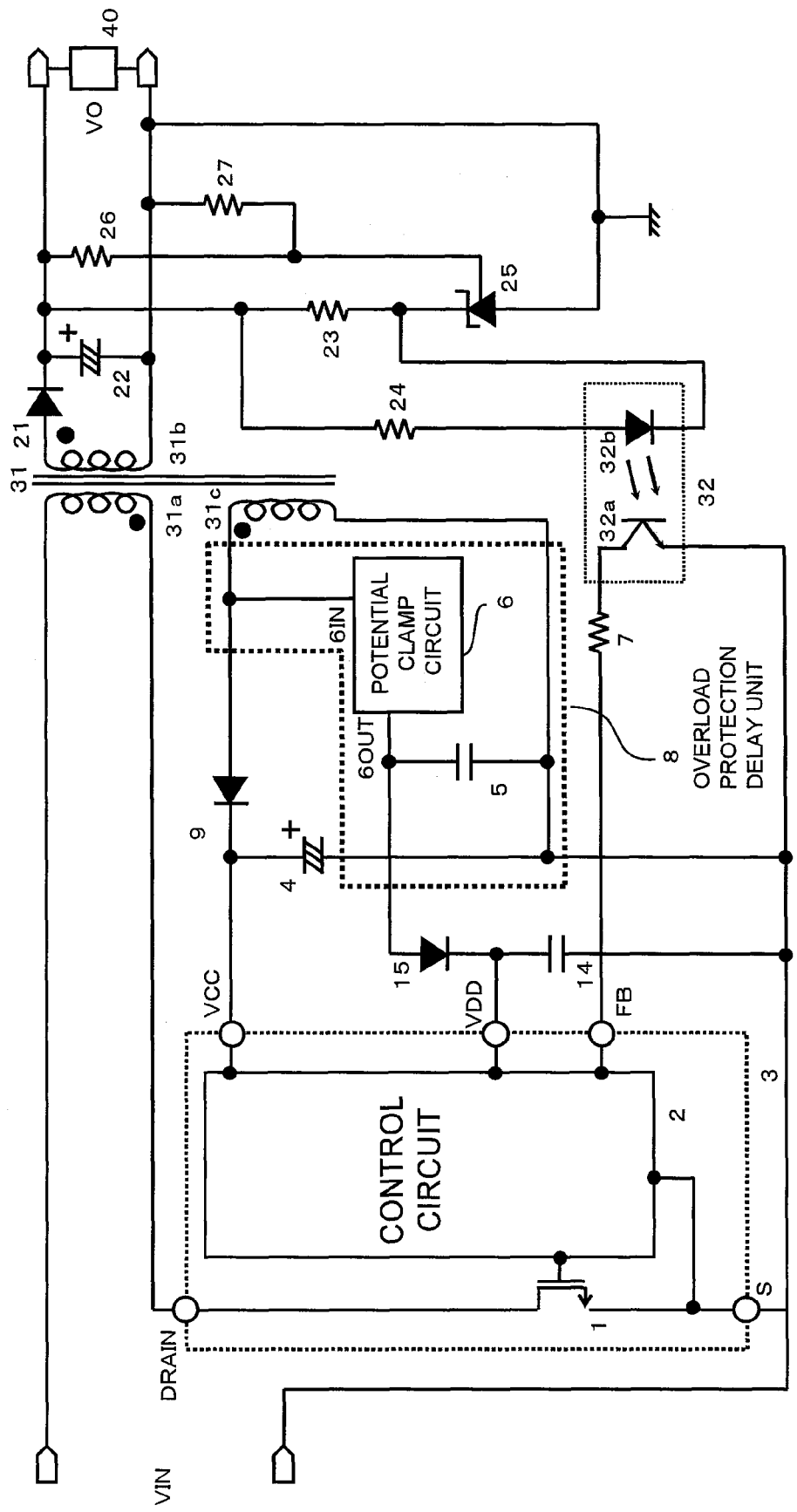
FIG. 13 is a block diagram showing a configuration of the switching power supply device according to the embodiment.

A circuit shown in FIG. 13 is an example of the switching power supply circuit according to the present invention in which the semiconductor device 3 of FIG. 14 is used. In the switching power supply, a capacitor 14 is connected between the VDD terminal and the SOURCE terminal in order to stabilize the power supply voltage VDD of the semiconductor element 3. The potential clamp circuit 6 and the capacitor 14 are connected to the VDD terminal through a diode 15.

Figure 15:
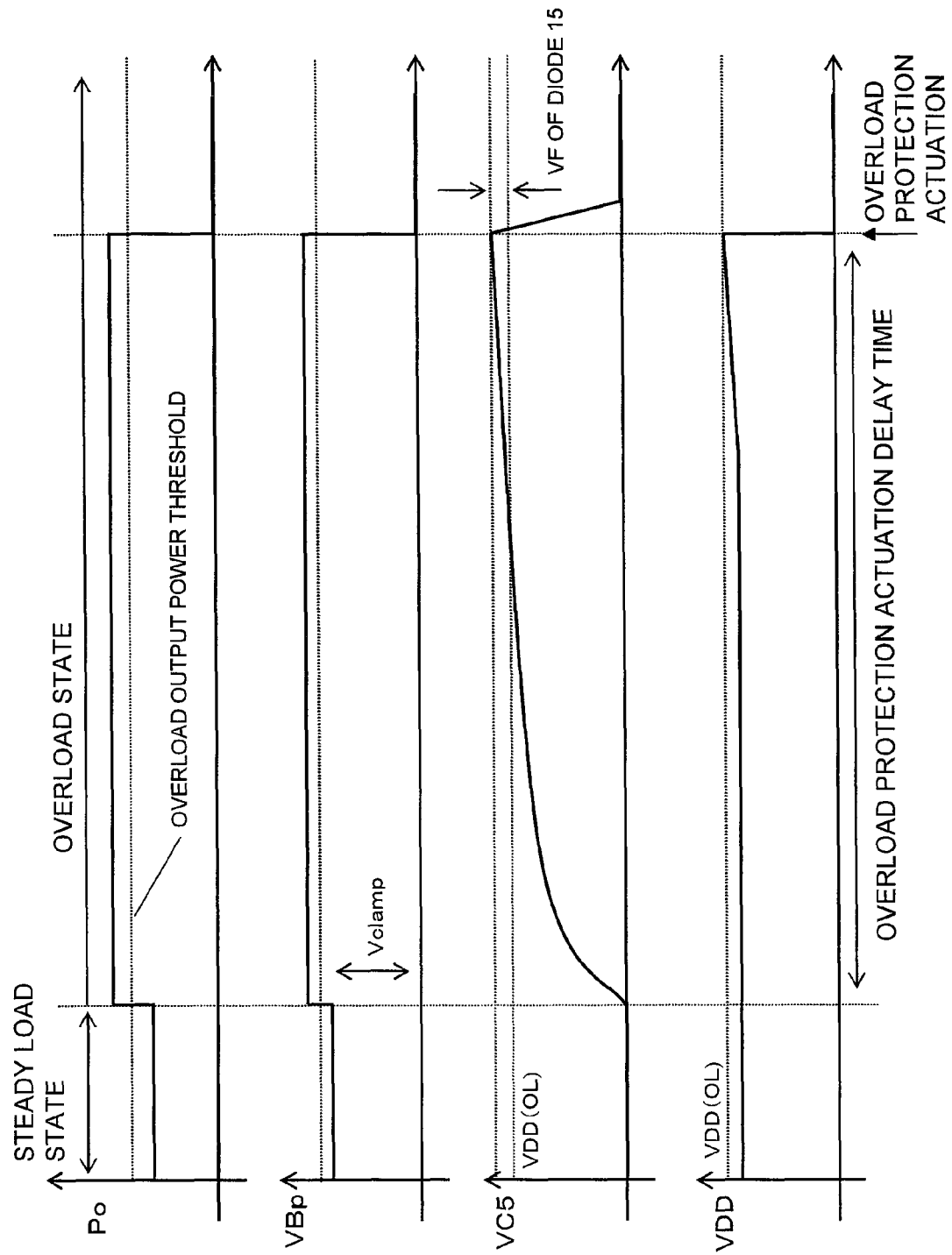
FIG. 15 is a timing chart showing an operation during an overload in the embodiment.

FIG. 15 is a timing chart showing an operation of the overload protection according to the present invention. Similarly to the aspects shown in FIGS. 1 to 11, when transition is made from the steady load state to the overload state, the peak value VBp of the auxiliary winding voltage rises with the increasing output power, and the capacitor 5 is charged. Assuming that VC5 is the potential difference of the capacitor 5, the VC5 rises as shown in FIG. 15, thereby raising the VDD voltage through the diode 15. When the VC5 becomes higher than the VDD(OL) by the forward voltage VF of the diode 15, the VDD voltage rises to the VDD (OL) to actuate the overload protection.

Similarly to the aspects shown in FIGS. 1 to 11, the aspect shown in FIGS. 13 and 14 can realize the overload protection in which the delay time similar to those of FIGS. 1 to 11 is secured by such an operation.

Figure 16:
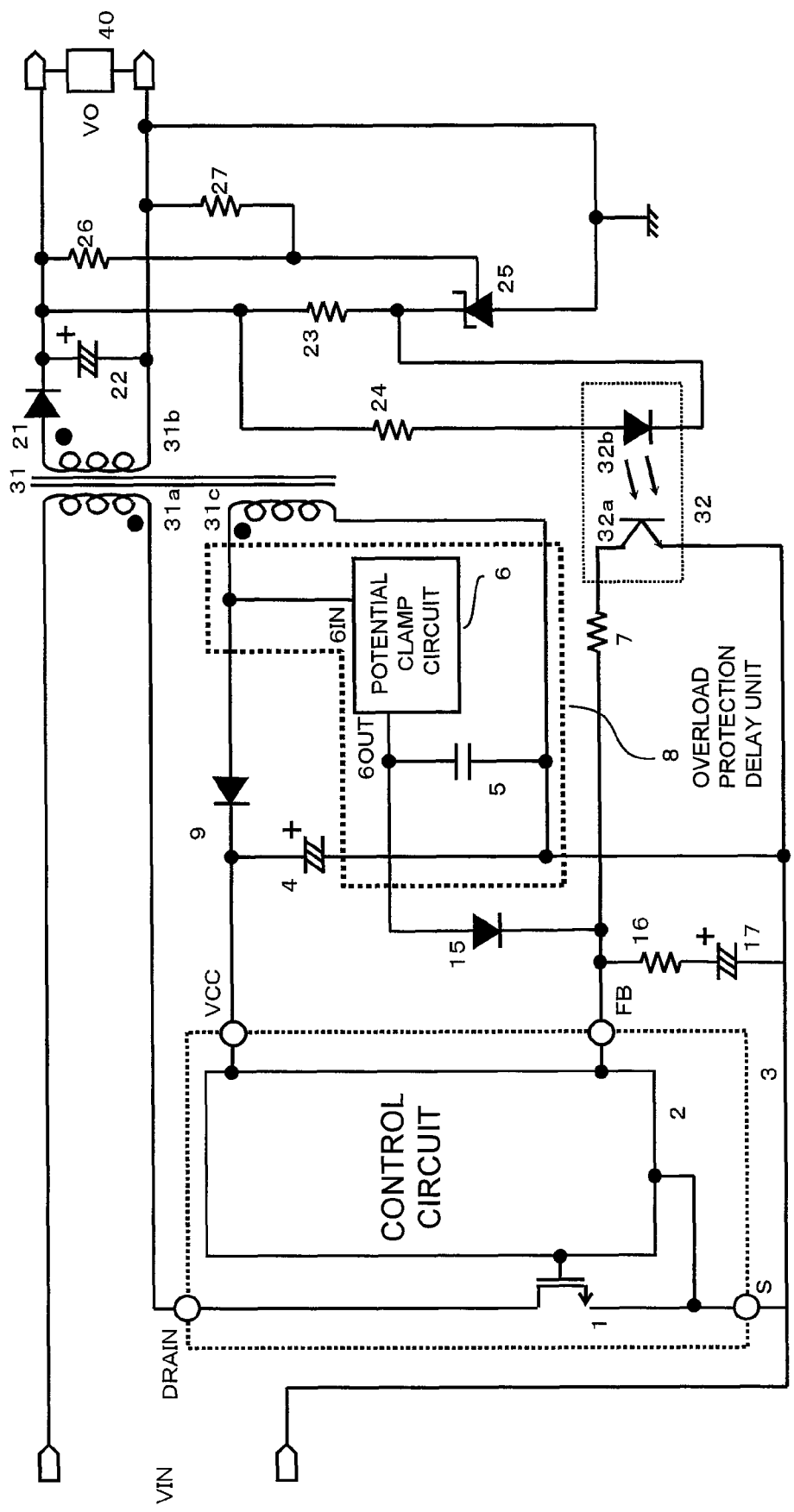
FIG. 16 is a block diagram showing a configuration of the switching power supply device according to the embodiment.

A circuit shown in FIG. 16 is an example of the switching power supply circuit in which the terminal (FB terminal) controlling feedback of the semiconductor element 3 has the function of detecting the overload protection.

Figure 17:
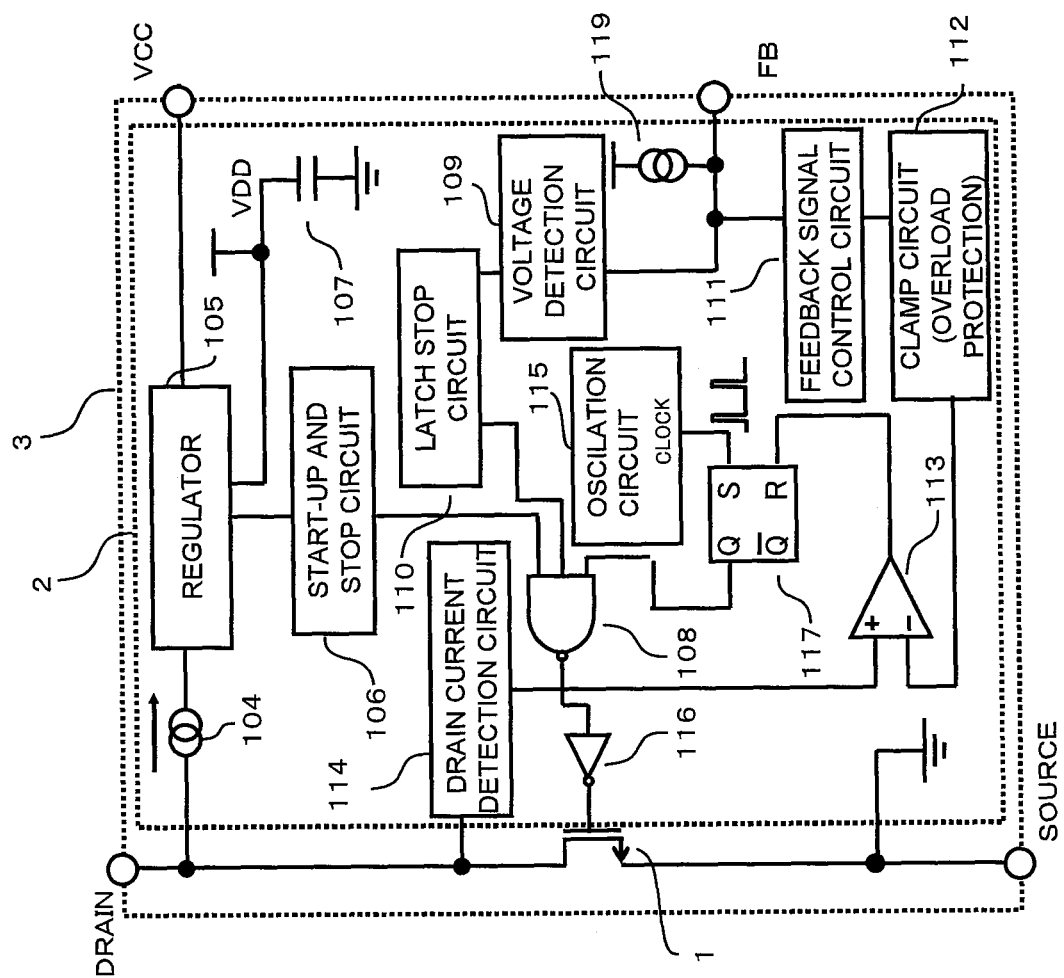
FIG. 17 is a block diagram showing a configuration of the semiconductor device for controlling the switching power supply device of the embodiment.

A circuit shown in FIG. 17 is the semiconductor device 3 used in FIG. 16. In the circuit of FIG. 17, the voltage detection circuit 109 is connected to the FB terminal, and the actuation signal is supplied to the latch stop circuit 110x to actuate the overload protection when the FB terminal voltage becomes a predetermined value VFB(OL) or more. The constant current source 119 is a constant current source which continuously supplies a constant current to the FB terminal.

In the circuit of FIG. 16, in addition to the overload protection in which the delay time is provided after the overload is detected using the overload protection delay unit 8 as described with reference to FIGS. 1 to 11 and 13 to 15, overload protection can be actuated immediately after the overload is detected or for the delay time shorter than that of the above-described method when the output power is further increased.

Figure 18:
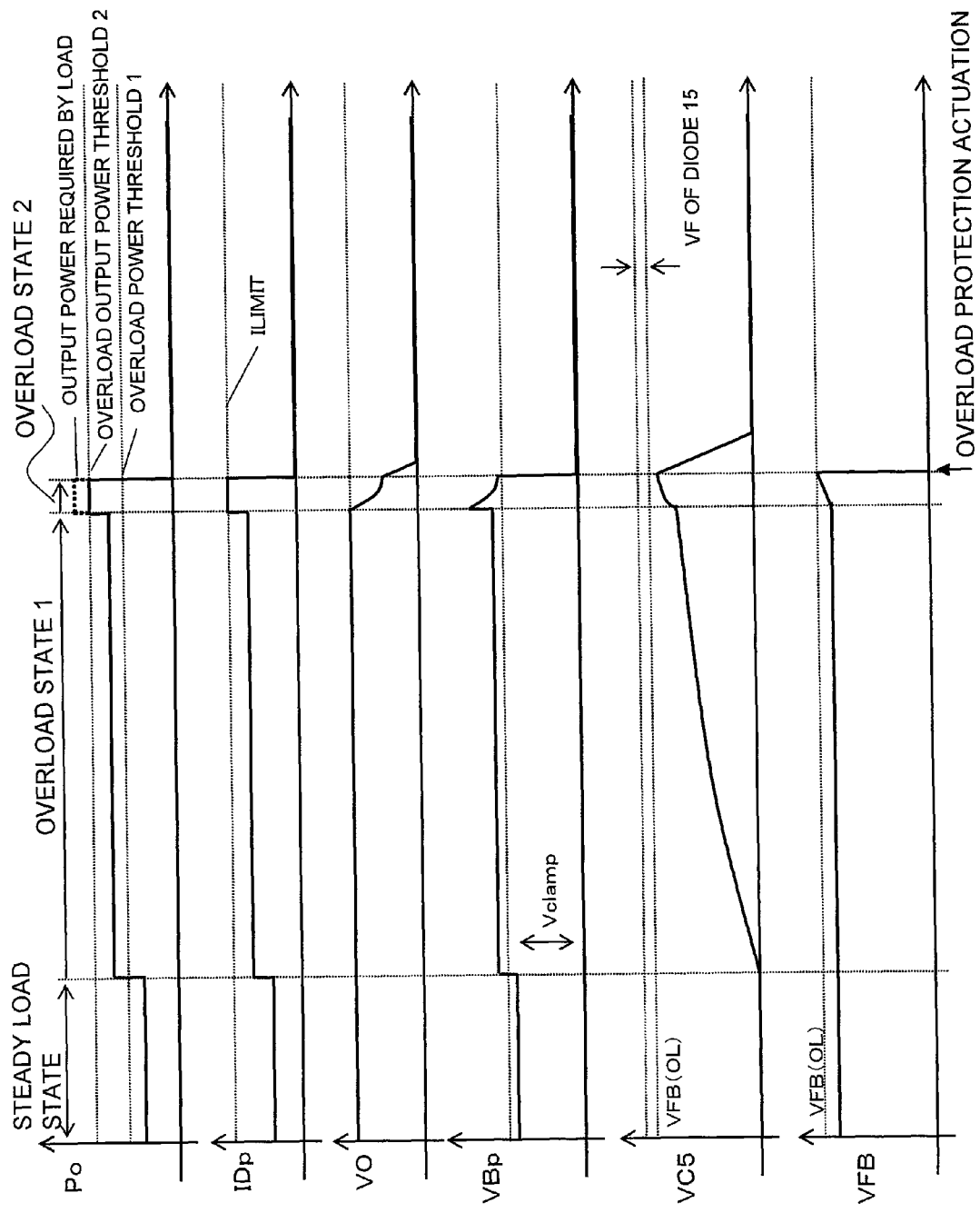
FIG. 18 is a timing chart showing an operation during an overload in the embodiment.

FIG. 18 is a timing chart showing an operation in actuating the overload protection of the embodiment. At this point, it is assumed that an overload state 1 is the state in which the output power is larger than an overload output power threshold 1 while being smaller than an overload output power threshold 2, and it is assumed that an overload state 2 is the state in which the output power is larger than the overload output power threshold 2. In the timing chart, transition is made to the overload protection state 2 before the overload protection is actuated in the overload protection state 1.

When the output power is increased from the steady load state to the overload state 1, the VBp exceeds the Vclamp, and the capacitor 5 is charged to raise the VC5. When the overload state 1 is continued to raise the VC5 to a value higher than the VFB(OL) by the VF of the diode 15, the VFB becomes equal to the VFB(OL) to actuate the overload protection described above with reference to FIGS. 1 to 11 and 13 to 15. However, in the timing chart, transition is made to the overload protection state 2 before the overload protection in this state is actuated.

As described above, in the overload state 2, the output required by the load 40 is larger than the overload output power threshold 2. The overload output power threshold 2 is the output power at the time where the peak value IDp of the drain current is increased to the maximum value ILIMIT of the drain current peak value determined by the control circuit 2.

Because the output power is monotonically increased to the drain current peak value IDp, the power supply cannot supply power larger than the overload output power threshold 2 even if the load 40 requires the power not lower than the overload output power threshold 2. Therefore, the output voltage VO lowers.

When the output voltage VO lowers, a current is not passed through the shunt regulator 25, whereby a current is not passed through the photodiode 32b and phototransistor 32a of the photocoupler 32. In the control circuit 2 of FIG. 17, the constant current source 119 is connected to the FB terminal, and a constant current is continuously passed through the FB terminal even if a current is not passed through the phototransistor 32a. Therefore, the capacitor 17 is charged by the current. That is, in the control circuit 2 of FIG. 17, the current flows into the capacitor 17 from the FB terminal as the output voltage VO is decreased in the overload state 2. Therefore, the voltage VFB at the FB terminal rises and the overload protection is actuated when the VFB becomes equal to the VFB (OL).

Through the method, in the circuit of FIG. 16, in addition to the overload protection in which the delay time is provided after an overload is detected in the overload state 1, overload protection can be actuated immediately after the overload is detected or for the delay time shorter than that of the above-described method when the output power is increased to the overload state 2. The protection can securely be actuated by the method, even in the state where the overload protection actuated in the overload state 1 cannot be actuated because the output voltage VO lowers to decrease the auxiliary winding voltage and hence the VBp does not rise to the Vclamp when the power required by the load cannot be supplied to the output portion for some reason.

In the overload state 1 and the overload state 2, using the different unit, the overload protection can be performed by an application of the method.

Figure 20:
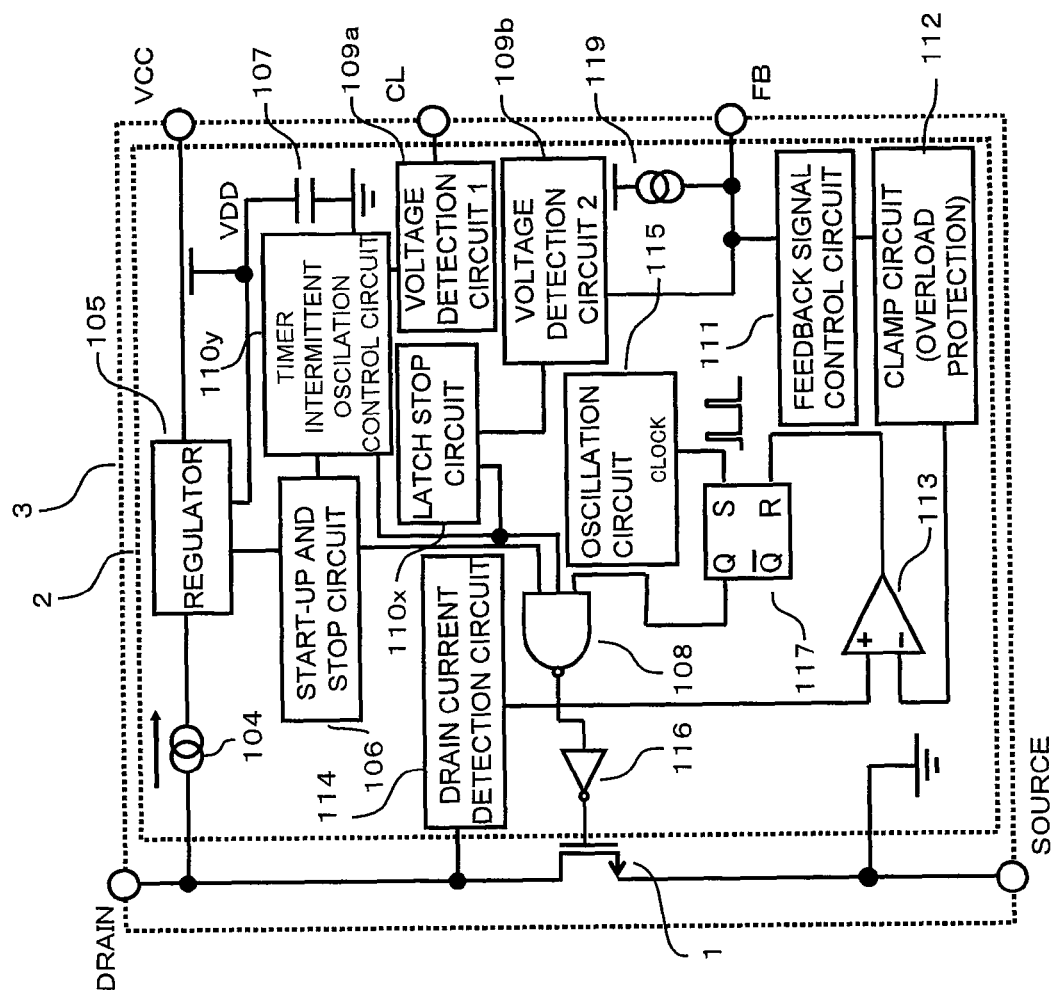
FIG. 20 is a block diagram showing a configuration of the semiconductor device for controlling the switching power supply device of the embodiment.
Figure 21:
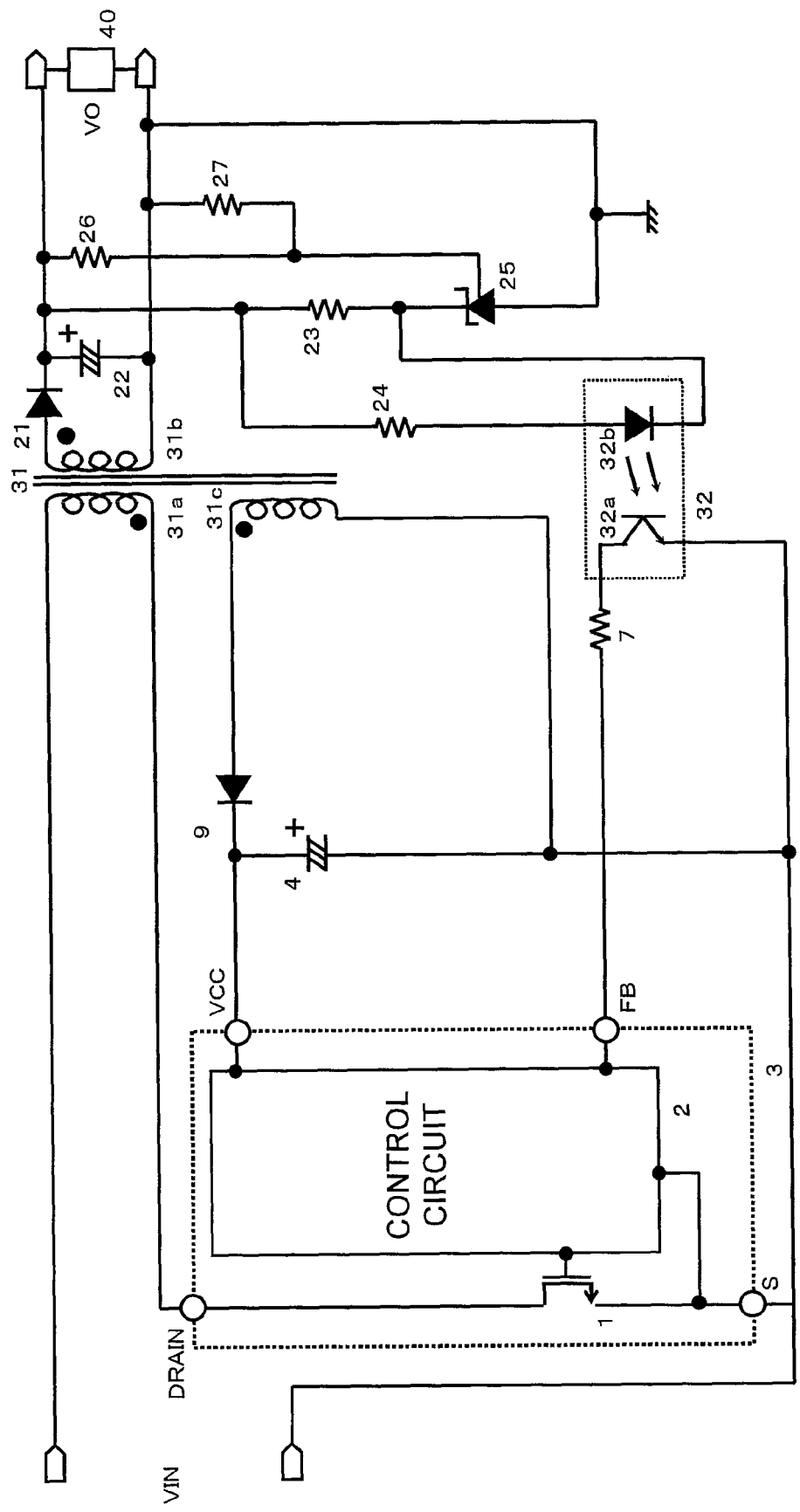
FIG. 21 is a block diagram showing a configuration of a conventional switching power supply device of Japanese Unexamined Patent Publication No. 06-197530.

For example, in the control circuit 2 shown in FIG. 20, the constant current source 119, a voltage detection circuit 2 109b, and the latch stop circuit 110x are connected to the FB terminal as in FIG. 17, and the voltage detection circuit 1 109a and the timer intermittent oscillation control circuit 110y are connected to the CL terminal as in FIG. 10.

Figure 19:
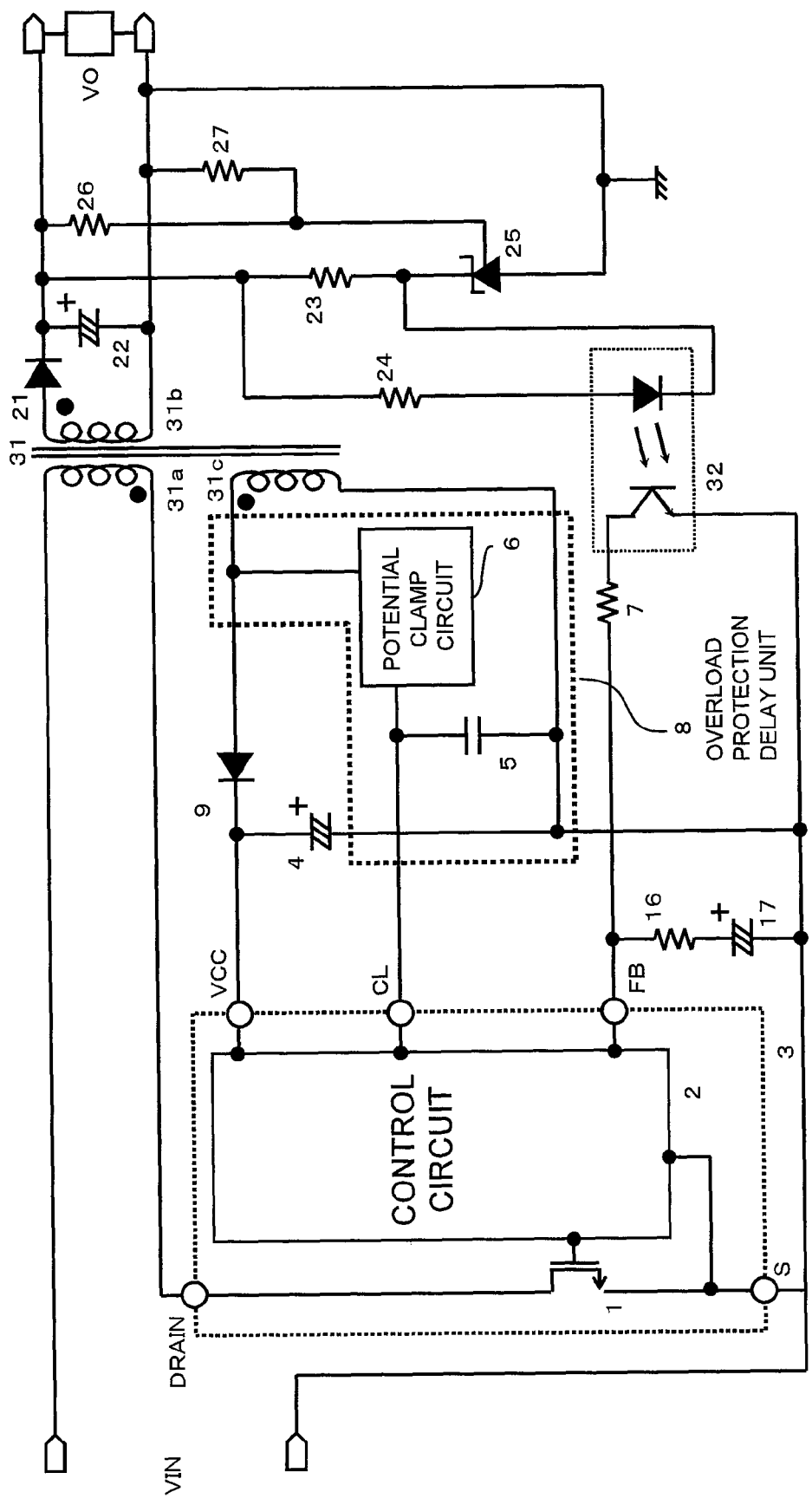
FIG. 19 is a block diagram showing a configuration of the switching power supply device according to the embodiment.

In the power supply in which the control circuit 2 of FIG. 20 and the switching power supply circuit of FIG. 19 are used, the timer intermittent oscillation operation is actuated in the overload state 1, and the latch stop is actuated in the overload state 2. The different overload protection circuits are separately provided in the two overload detection methods. Therefore, the self-reset type timer intermittent oscillation is used for the overload protection in the overload state 1, and the latch stop is used for overload protection in the overload state 2, so that the overload protection can be actuated according to each state.

In the above description, the self-reset type timer intermittent oscillation is used for the overload protection in the overload state 1 and the latch stop is used for the overload protection in the overload state 2 by way of example. Alternatively, the latch stop may be used for overload protection in the overload state 1 while the self-reset type timer intermittent oscillation is used for the overload protection in the overload state 2, or any method may be used as long as the protection can be performed during the overload.

In the embodiments shown in FIGS. 16, 17, 19, and 20, the drain current peak value IDp is increased to the ILIMIT to lower the output voltage VO, thereby detecting the overload state 2. Because a gain of the shunt regulator is sufficiently large with respect to the change in VO, it can also be thought that the overload state 2 is detected by increasing the drain current peak value IDp to the ILIMIT. Accordingly, the detection of the overload state 2 can be replaced by detecting that the drain current peak value IDp is increased to a certain value.

In the function of the embodiment shown in FIGS. 16 and 17, the constant current source 119 is connected to the FB terminal, and the overload protection corresponding to the overload state 2 is actuated such that the voltage at the FB terminal rises when the output voltage VO is lowered. By utilizing the rise of the voltage at the FB terminal, the protection in the overload state 1 can be performed without the function, and the same effect as those of FIGS. 1 to 11 and 13 to 15 can be obtained.

Thus, according to the embodiments of the present invention, the overload protection in which the output power for detecting an overload has weak dependence on the input voltage can be realized with sufficient delay time, fewer additional components, and a small capacitance, and low cost and space-saving can be achieved. A commercially available semiconductor control IC is used in the embodiments. Therefore, in the case where the power supply is designed by controlling and driving the switching element, any control IC can be used as long as the control IC has one terminal at which the protection is actuated when the terminal voltage rises.

In the embodiments shown in FIGS. 13 to 15, 16, and 17, the diode 15 is connected to the VDD terminal or FB terminal at which an overload state is detected. Because the overload protection delay unit has an influence on each terminal while having no influence on the operation of the semiconductor element, the removal of the diode 15 has no influence on the operation of the overload protection.

In the embodiments shown in FIGS. 16, 17, 19, and 20, the resistor 16 and the capacitor 17 are connected to the FB terminal.

At the start-up or in an unstable operation or in the case where a noise is applied to the FB terminal, the capacitor 17 prevents the state in which easy rise of the voltage at the FB terminal causes the VFB to become equal to the VFB(OL) to actuate the overload protection, and the resistor 16 prevents the capacitor 17 from delaying the feedback reaction. The similar overload protection can be realized even if the resistor 16 and the capacitor 17 are removed.

The feedback system in which the shunt regulator 25 and the photocoupler 32 are used is used in the above description of the present invention. Alternatively, a feedback system in which the shunt regulator 25 and the photocoupler 32 are not used may be used.

Figure 12:
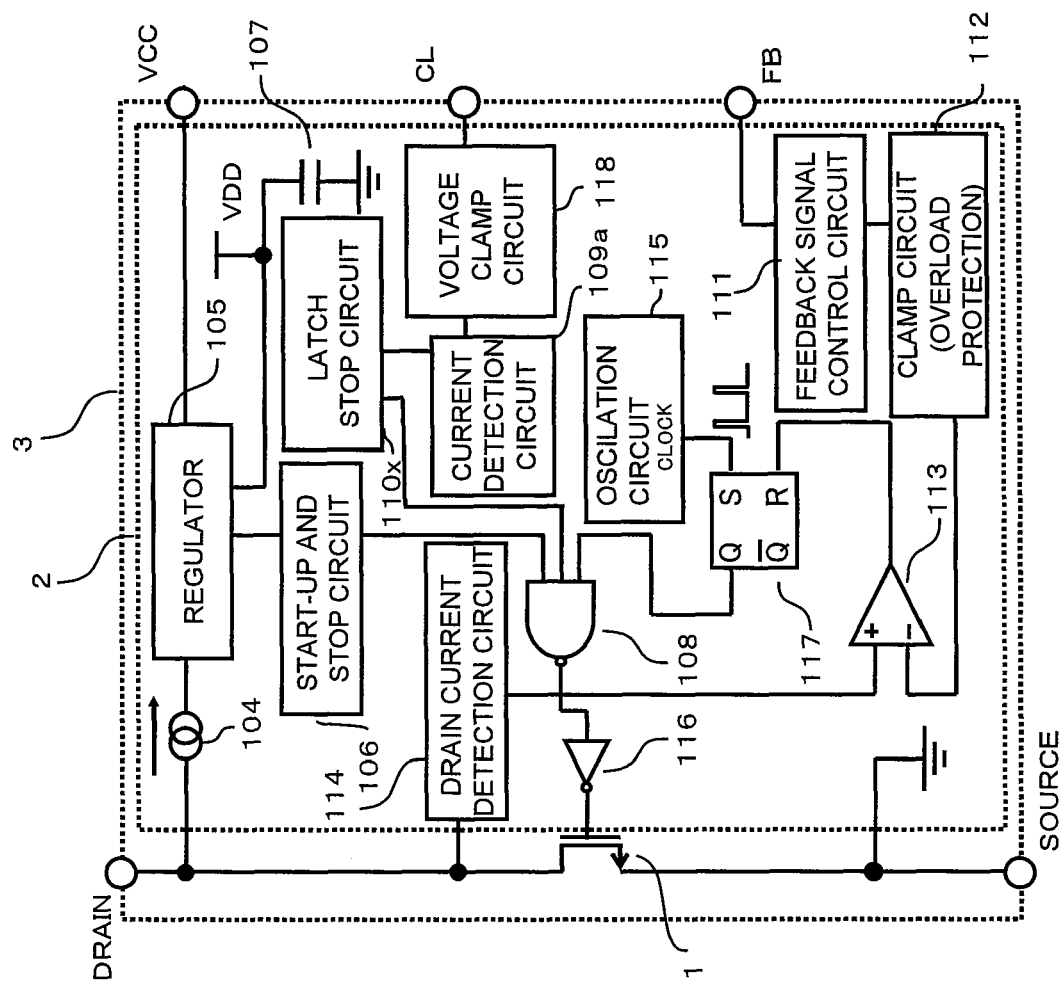
FIG. 12 is a block diagram showing a configuration of the semiconductor device for controlling the switching power supply device of the embodiment.

In the embodiments shown in FIGS. 1 to 11 and 13 to 20, an overload is detected by detecting the voltage at the detection terminal (CL terminal, VDD terminal, or FB terminal). Alternatively, as shown in FIG. 12, an increase in current flowing into each detection terminal by the rise of the potential at the capacitor 5 may be detected, thereby detecting the overload.

According to the present invention, even if other components and circuits are added, the same effect can be obtained as long as the basic configuration is constituted by the potential clamp circuit 6, the capacitor 5, the circuit detecting the rise of potential at the capacitor 5, the overload protection unit such as the latch stop circuit 100x and the timer intermittent oscillation control circuit 110x.

The switching element and the control circuit can easily be united by providing the switching element and the control circuit in the same semiconductor device. Accordingly, the number of components constituting the circuit can be decreased by providing the main circuit components in a single semiconductor device, and the miniaturization, weight reduction, and cost reduction can easily be achieved as the power supply device.

According to the switching power supply device of the present invention, the overload protection having a sufficient delay time can be realized at low cost by addition of small-sized components. Therefore, for example, the present invention is useful in an electronic device on which a motor that requires instantaneously large current is mounted.

Although the present invention has been described in connection with the preferred embodiments thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. A switching power supply device comprising:
   a transformer having a first winding, a second winding, and a third winding;
   a switching element connected in series to the first winding;
   a control circuit which controls a switching operation of the switching element;
   a potential clamp circuit connected to the third winding and a delay generation capacitor, the third winding being equal in polarity to the second winding, the potential clamp circuit supplying power to the delay generation capacitor when one of potentials at the third winding becomes a predetermined value or more; and
   the delay generation capacitor connected to the potential clamp circuit, wherein
   the control circuit includes a first overload protection unit and has a function of actuating overload protection when a potential at the delay generation capacitor becomes a predetermined value or more.

2. The switching power supply device according to claim 1, wherein the first overload protection unit included in the control circuit is a latch stop type.

3. The switching power supply device according to claim 1, wherein the first overload protection unit included in the control circuit is a self-reset type.

4. The switching power supply device according to claim 1, wherein the first overload protection unit included in the control circuit sets a period during which the switching element performs the switching operation to a predetermined ratio or less compared with a period during which the switching element does not perform the switching operation.

5. The switching power supply device according to claim 1, further comprising a discharging unit for discharging the delay generation capacitor.

6. The switching power supply device according to claim 5, wherein the discharging unit for discharging the delay generation capacitor is a resistor.

7. The switching power supply device according to claim 1, wherein a resistor is connected in series to the potential clamp circuit.

8. The switching power supply device according to claim 1, wherein a first diode is connected in series to the potential clamp circuit.

9. The switching power supply device according to claim 1, wherein the potential clamp circuit is configured such that a second diode and a Zener diode are connected in series with their polarities opposite to each other.

10. The switching power supply device according to claim 9, wherein a resistor is inserted to be connected in series to the Zener diode and the second diode.

11. The switching power supply device according to claim 9, wherein a third diode is inserted in a direction identical to that of the first diode to be connected in series to the Zener diode and the second diode.

12. The switching power supply device according to claim 9, wherein one or a plurality of Zener diodes are inserted to be connected in series to the Zener diode and the second diode.

13. The switching power supply device according to claim 1, wherein, in the control circuit, a unit detecting a potential at the delay generation capacitor is shared by a power supply unit of the control circuit.

14. The switching power supply device according to claim 1, further comprising output detection unit for detecting an output state of the second winding,
   wherein the control circuit includes a feedback unit into which an output signal of the output detection unit is fed, and
   the feedback unit has a function of detecting that a potential at the delay generation capacitor becomes a predetermined value or more.

15. The switching power supply device according to claim 1, wherein a portion or the whole of the control circuit unit is configured on a semiconductor substrate.

16. The switching power supply device according to claim 1, wherein a portion or the whole of the control circuit unit and the switching element are configured on an identical semiconductor substrate.

17. A switching power supply device comprising:
   a transformer having a first winding, a second winding, and a third winding;
   a switching element connected in series to the first winding;
   a control circuit which controls a switching operation of the switching element;
   a potential clamp circuit connected to the third winding and a delay generation capacitor, the third winding being equal in polarity to the second winding, the potential clamp circuit supplying power to the delay generation capacitor when one of potentials at the third winding becomes a predetermined value or more; and
   the delay generation capacitor connected to the potential clamp circuit, wherein
   the control circuit includes second overload detection unit which is different from first overload detection unit, the first overload detection unit being configured by a function of actuating overload protection when a potential at the delay generation capacitor becomes a predetermined value or more.

18. The switching power supply device according to claim 17, wherein the second overload detection unit is a method for detecting that an output voltage at the second winding is lowered.

19. The switching power supply device according to claim 17, wherein the second overload detection unit is a method for detecting a current passed through the switching element becomes a predetermined value or more.

20. The switching power supply device according to claim 17, further comprising output detection unit for detecting an output state of the second winding,
   wherein the control circuit includes a feedback unit into which an output signal of the output detection unit is fed,
   a signal fed into the feedback unit is a current signal, and
   the second overload detection unit is a method for detecting that the current signal becomes zero or a predetermined value or less.

21. The switching power supply device according to claim 20, wherein, in the control circuit, the second overload detection unit is a method in which a constant current source is connected to the feedback unit and a potential at the feedback unit becomes a predetermined value or more, thereby detecting overload protection.

22. The switching power supply device according to claim 17, wherein the control circuit unit includes second overload protection unit which is different from the first overload protection unit,
   the first overload protection unit actuates overload protection when the first overload detection unit detects an overload, and
   the second overload protection unit actuates overload protection when the second overload detection unit detects an overload.

23. The switching power supply device according to claim 17, wherein, in the control circuit unit, the first overload protection unit actuates overload protection, when the first overload detection unit detects an overload, or when the second overload detection unit detects an overload.

24. The switching power supply device according to claim 23, wherein, in the control circuit unit, the feedback unit has a function of detecting that a potential at the delay capacitor becomes a predetermined value or more using the first overload detection unit.

25. A method for detecting an overload in a switching power supply which includes:
   a transformer having a first winding, a second winding, and a third winding;
   a switching element connected in series to the first winding;
   a control circuit which controls a switching operation of the switching element, the control circuit including first overload protection unit;
   a potential clamp circuit connected to the third winding and a delay generation capacitor, the third winding being equal in polarity to the second winding; and
   the delay generation capacitor connected to the potential clamp circuit, the method comprising the step of:
   detecting that, in an overload state, only a portion of a pulse emerging in a change in one of potentials at the third winding becomes higher than a predetermined value set in the potential clamp circuit, and
   that a potential at the delay generation capacitor with which power of only the portion of the pulse is charged rises.

26. A method for detecting an overload condition in a switching power supply that includes a transformer having a plurality of windings, a capacitor, a potential clamp circuit coupled to one of the plurality of windings and the capacitor; the method including the steps of:
   charging the capacitor using a portion of an output pulse from the one of the plurality of windings that is higher in potential than a predetermined value set in the potential clamp circuit;
   responsive to an overload state, detecting that: (1) the portion of the output pulse from the one of the plurality of windings is higher in potential than the predetermined value set in the potential clamp circuit and (2) a potential at the capacitor increases to a predetermined threshold value, as a first detecting step; and
   detecting for the overload condition using a second detecting step different from the first detecting step.

27. The method according to claim 26, wherein the second detecting step includes detecting that a voltage at an output portion of a second one of the windings of the transformer decreases.

28. The method according to claim 26, wherein:
   the switching power supply includes a switching element coupled to a second one of the windings of the transformer, and
   the second detecting step includes detecting a current passing through the switching element which increases to a second predetermined value.

29. The method according to claim 26, wherein the switching power supply includes an overload protection unit for actuation of overload protection, the method further including actuating the overload protection, by the overload protection unit, when the overload condition is detected by one of the first or second detecting steps.

30. The method according to claim 26, wherein the switching power supply includes first and second overload protection units, each separately performing actuation of overload protection, the method comprising the steps of:
   responsive to the first detecting step detecting the overload state, performing, by the first overload protection unit, actuation of the overload protection; and
   responsive to the second detecting step detecting the overload state, performing, by the second overload protection unit, actuation of the overload protection.

* * * * *